United States Patent [19]
Fukuda et al.

[11] Patent Number: 6,018,878
[45] Date of Patent: Feb. 1, 2000

[54] APPARATUS FOR EXAMINING WHEEL ALIGNMENT

[75] Inventors: Yutaka Fukuda, Tokorozawa; Yukio Higuchi, Fuji; Ryoichi Abe, Numazu, all of Japan

[73] Assignee: Anzen Motor Car Co., Ltd., Tokyo, Japan

[21] Appl. No.: 08/975,233

[22] Filed: Nov. 21, 1997

Related U.S. Application Data

[62] Division of application No. 08/507,182, Jul. 26, 1995, abandoned.

[30] Foreign Application Priority Data

Jul. 29, 1994 [JP] Japan .................................. 6-178216

[51] Int. Cl.⁷ .................................................. G01B 5/255
[52] U.S. Cl. .................................. 33/203.12; 33/203.13; 33/203.18
[58] Field of Search .......................... 33/203.12, 203.13, 33/203.14, 203.15, 203.16, 203.17, 203, 203.18, 203.19, 203.2

[56] References Cited

U.S. PATENT DOCUMENTS

| | | |
|---|---|---|
| 1,992,521 | 2/1935 | Creagmile . |
| 2,046,528 | 7/1936 | Morse et al. . |
| 2,061,326 | 11/1936 | Morse et al. . |
| 2,160,145 | 5/1939 | Holmes . |
| 2,378,631 | 6/1945 | Holmes . |
| 2,953,857 | 7/1960 | Mineck . |
| 3,181,248 | 5/1965 | Manlove . |
| 3,546,782 | 12/1970 | Pereue et al. ........................ 33/203.13 |
| 3,780,573 | 12/1973 | Reus . |
| 3,908,280 | 9/1975 | Murakami et al. . |
| 4,192,074 | 3/1980 | Chang ................................. 33/203.15 |
| 4,389,793 | 6/1983 | Butler . |
| 4,394,798 | 7/1983 | Beissbarth . |
| 4,567,667 | 2/1986 | Minagawa et al. ................... 33/203.12 |
| 4,860,457 | 8/1989 | Beissbarth . |
| 4,901,560 | 2/1990 | Hirano et al. ........................ 33/203.13 |
| 4,953,296 | 9/1990 | Spainhour . |
| 4,962,664 | 10/1990 | Hirano et al. . |
| 5,088,320 | 2/1992 | Fukuda et al. ........................ 33/203.11 |
| 5,090,235 | 2/1992 | Hirano et al. . |
| 5,297,344 | 3/1994 | Fukuda et al. . |
| 5,311,668 | 5/1994 | Longa et al. .......................... 33/203.12 |
| 5,313,710 | 5/1994 | Wakamori et al. ................... 33/203.12 |
| 5,355,586 | 10/1994 | Pukuda et al. ........................ 33/203.13 |

FOREIGN PATENT DOCUMENTS

| | | |
|---|---|---|
| 0468369 | 1/1992 | European Pat. Off. . |
| 1317694 | 1/1963 | France . |
| 2726927 | 12/1978 | Germany . |
| 3040252 A1 | 10/1982 | Germany . |
| 3136145 | 3/1983 | Germany . |
| 2-161333 | 12/1988 | Japan . |
| 3-39633 | 2/1991 | Japan . |
| 1033964 | 3/1963 | United Kingdom . |
| 1367603 | 9/1974 | United Kingdom . |
| 1535108 | 12/1978 | United Kingdom . |
| 2139772 | 11/1984 | United Kingdom . |
| 2153094 | 8/1985 | United Kingdom . |
| 2204954 | 11/1988 | United Kingdom . |
| 2239099 | 6/1991 | United Kingdom . |
| WO 88/06269 | 8/1988 | WIPO . |
| WO 90/03561 | 4/1990 | WIPO . |

*Primary Examiner*—Andrew Hirshfeld
*Attorney, Agent, or Firm*—Skjerven, Morrill, MacPherson, Franklin & Friel LLP; Alan H. MacPherson; Hugh H. Matsubayashi

[57] ABSTRACT

Detection of angles associated with wheel alignment of a vehicle can be carried out properly at all times according to the present wheel alignment examining apparatus irrespective of the size of a wheel to be examined. The present apparatus includes a sensor member (105, 106) pressed against a side surface of a wheel (11) to be examined and thus the sensor member rotates together with the wheel to be examined. Various inclination angles, such as toe, camber, caster and king pin angles, are detected from a displacement of the sensor member during its rotation. Use may be made of either a Cardan suspension mechanism or link mechanism for supporting the sensor member. When use is made of a link mechanism, toe and camber angles can be detected by the same encoder.

10 Claims, 19 Drawing Sheets

F I G. 15
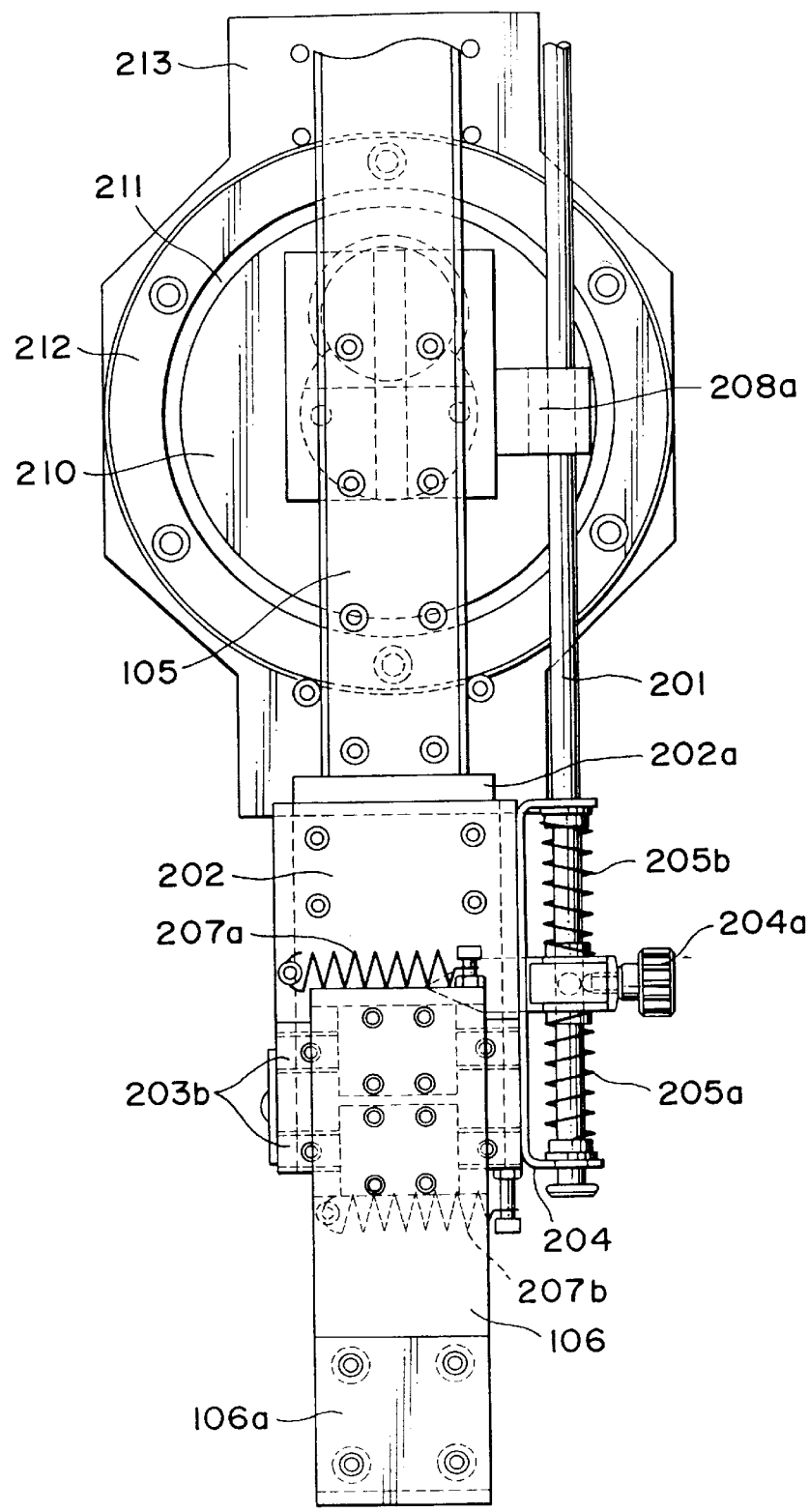

APPARATUS FOR EXAMINING WHEEL ALIGNMENT

This application is a division of application Ser. No. 08/507,182, filed Jul. 26, 1995 now abandoned.

BACKGROUND OF THE INVENTION

1. Field of the Invention

This invention generally relates to an apparatus for examining alignment conditions of a wheel mounted on a vehicle, such as an automobile, and, in particular, to a wheel alignment examining apparatus capable of examining at least one of various wheel alignment inclination angles to be set on wheels mounted on a vehicle, such as toe, camber, caster and king pin inclination angles.

2. Description of the Prior Art

In order to secure an excellent running performance of a vehicle, such as an automobile, various inclination angles, such as toe, camber, caster and king pin inclination angles, are set on wheels mounted on a vehicle, such as an automobile. Many systems and apparatuses for examining the inclination angles of a wheel mounted on a vehicle have been proposed, including those for examining the inclination angles of a wheel statically by bringing a contact member in static contact with an outer side surface of the wheel while the wheel is maintained at rest and those for measuring the inclination angles of a wheel dynamically by bringing a roller in rolling contact with a side wall of the wheel while the wheel is set in rotation. Also proposed has been an apparatus for examining the inclination angles of a wheel by clamping the wheel at the opposite sides with rollers as described in the Japanese Pat. Laid-open Pub. No. 2-161333.

However, in such prior art technology, in particular the one to carry out a dynamic examination by maintaining a wheel in rotation during examination, the wheel is rotated while maintaining a roller at a fixed location, and, thus, it is not possible to measure variations in the inclination angles of a wheel at various rotating locations thereof. Accordingly, no particular problems may arise if wheels of the same kind, i.e., same in dimension and shape, are examined; however, if it is necessary to examine various wheels different in dimension and shape, poor accuracy in examination would result and there may result a situation where no examination can be carried out properly.

SUMMARY OF THE INVENTION

In accordance with one aspect of the present invention, there is provided a wheel alignment examining apparatus which comprises: a sensor member adapted to be pressed against one side of a wheel; supporting means for supporting the sensor member to be rotatable together with the wheel; first detecting means for detecting a location of the sensor member in a direction of rotation of the wheel; and second detecting means for detecting a displacement or variation in position of the sensor member in a direction perpendicular to the rotating direction of the wheel.

The first detecting means preferably may include a rotary type sensor, such as a rotary encoder, which can detect a rotating location of the sensor member pressed against the wheel to be examined, and, thus, a rotating location of the wheel to be examined. The second detecting means preferably may include an inclination angle sensor capable of detecting at least one of toe and camber angles of a wheel to be examined. In the case where toe and camber angles are to be detected separately, the second detecting means may include a first inclination angle sensor for detecting a toe angle and a second inclination angle sensor for detecting a camber angle; on the other hand, since the toe and camber angles are inclination angles of a wheel set in the horizontal and vertical directions, respectively, and the sensor member rotates together with the wheel to be examined, the second detecting means may include a common angle sensor for detecting both of toe and camber angles.

In one embodiment of the present invention, the sensor member includes means for adjusting its length and thus the length of the sensor member may be adjusted depending on the size of a wheel to be examined. In another embodiment of the present invention, the supporting means includes means for adjusting the height or vertical location of the sensor member and thus the height or vertical location of the sensor member may be adjusted depending on the size and/or shape of a wheel to be examined.

In the present apparatus, since the camber angle of a wheel to be examined can be measured, the caster angle of the wheel can be calculated by using a formula well known for one skilled in the art and steering the wheel over a predetermined angle to the left and to the right to determine a variation of the camber angle produced thereby. When the wheel to be tested is steered to the left and to the right by rotating a steering wheel, the wheel to be tested moves forward and backward. Thus, in view of this, in accordance with another structure of the present invention, it is so structured that the sensor member follows the forward and backward movement of the wheel to be tested so as to prevent undesired forces being produced between the wheel to be tested and the sensor member.

In accordance with another aspect of the present invention, the supporting means may include a sensor arm having an end to which the sensor member is fixedly attached and a Cardan suspension mechanism for supporting the sensor arm such that the sensor arm may be oriented in any direction. Alternatively, the supporting means may include a link mechanism operatively coupled to the sensor member. In the case where use is made of a link mechanism, provision is made of a two-part structure including a first section which rotates with the sensor arm in unison and a second section which executes a motion in association with a displacement of the sensor arm in a direction perpendicular to the rotating direction of the wheel to be examined without being rotated around the rotating center of the sensor arm with the provision of a rotary sensor for detecting a rotary location of the sensor member in an operatively coupled relationship with the first section and the provision of an angle detector for detecting toe and camber angles of a wheel to be examined in an operatively coupled relationship with the second section.

In accordance with a further aspect of the present invention, there is provided a wheel alignment examination apparatus, comprising: a sensor member adapted to be pressed against one side of a wheel to be examined; supporting means for supporting the sensor member to be rotatable together with the wheel to be examined in unison; first detecting means for detecting the location of the sensor member in a rotating direction of the wheel to be examined; and second detecting means for detecting a steered angle of the wheel to be examined. In this case, the king pin inclination angle can be detected by the first detecting means by having the wheel to be examined steered over a predetermined range of angles to the left and to the right, for example, by rotating an associated steering wheel. In this case also the supporting means may include either a Cardan suspension mechanism or a link mechanism.

In accordance with a still further aspect of the present invention, there is provided a wheel alignment examination apparatus, comprising: wheel supporting means for supporting a wheel to be examined; a sensor member adapted to be pressed against at least one side of the wheel to be examined supported on the wheel supporting means; and inclination angle detecting means operatively coupled to the sensor member for detecting an inclination angle of the wheel to be examined from a displacement or change in position of the sensor member, whereby at least the sensor member is supported to be movable forward and backward with respect to the present examination apparatus. In an embodiment of this aspect of the present invention, the sensor member and the inclination angle detecting means are both supported on the same support which is provided to be movable either in the forward or backward direction.

In an alternative embodiment, the wheel support means includes a roller unit and a table unit and the roller unit includes a pair of rotatable support rollers for supporting thereon a wheel to be examined. On the other hand, the table unit preferably includes a first table provided to be movable in the forward or backward direction of the present apparatus and the support is fixedly attached to the first table. Besides, in a preferred embodiment, the table unit also includes a second table, which is provided to be movable in a transverse direction perpendicular to the forward and backward direction of the present apparatus, and the second table is disposed above the first table to be movable in either the forward or backward direction. In addition, a rotary bearing is provided on the first table and the roller unit is supported on the first table through this rotary bearing. Thus, the support rollers having their rotating axes extending in the horizontal direction may freely rotate around a predetermined vertical axis, which is the rotating axis of the rotary bearing, and they are translatable in any direction within a horizontal plane.

In this manner, by providing the sensor member to be movable either in the forward or backward direction of the present examination apparatus, the center of the sensor member may be brought into agreement with the rotating center of a wheel to be examined as much as possible, so that various inclination angles, such as toe, camber, caster and king pin inclination angles, can be detected at high accuracy. In particular, among automobiles having wheels to be examined, there may be a case where the wheel base differs between the right wheels and the left wheels; however, such a difference in the wheel base between the right wheels and the left wheels can be advantageously absorbed by providing the sensor member pressed against a wheel to be examined both in the forward and backward directions according to one aspect of the present invention, thereby allowing to provide an increased detecting accuracy. In this case, the sensor member may be of the type which detects an inclination angle of a wheel to be examined as pressed against one side of the wheel or of the type to be pressed against a wheel to be examined while maintained at a fixed location as in the prior art. For example, a roller may be used as the sensor member and use may also be made of the type in which a wheel to be examined is clamped from both sides.

It is to be noted that each of specific wheel alignment examination apparatuses described herein may define a novel invention as a whole and various aspects or features of the present invention incorporated in such an apparatus may also define separate inventions themselves. For example, an apparatus according to the present invention may be constructed to have any one or more of various configurations for examining or measuring one, two or more or all of toe, camber, caster and king pin inclination angles.

It is therefore a primary object of the present invention to obviate the disadvantages of the prior art as described above and to provide a wheel alignment examining apparatus capable of examining an inclination angle of a wheel mounted on a vehicle, such as an automobile, irrespective of the dimension and shape of the wheel.

Another object of the present invention is to provide a wheel alignment examining apparatus capable of examining the inclination angles of a wheel mounted on a vehicle, such as an automobile, with an increased accuracy.

A further object of the present invention is to provide a wheel alignment examining apparatus capable of examining at least one of toe, camber, caster and king pin inclination angles.

Other objects, advantages and novel features of the present invention will become apparent from the following detailed description of the invention when considered in conjunction with the accompanying drawings.

BRIEF DESCRIPTION OF THE DRAWINGS

FIG. 15 is a front view showing part of a sensor member used in the apparatus shown in FIG. 14.

DESCRIPTION OF THE PREFERRED EMBODIMENTS

Figure 1:
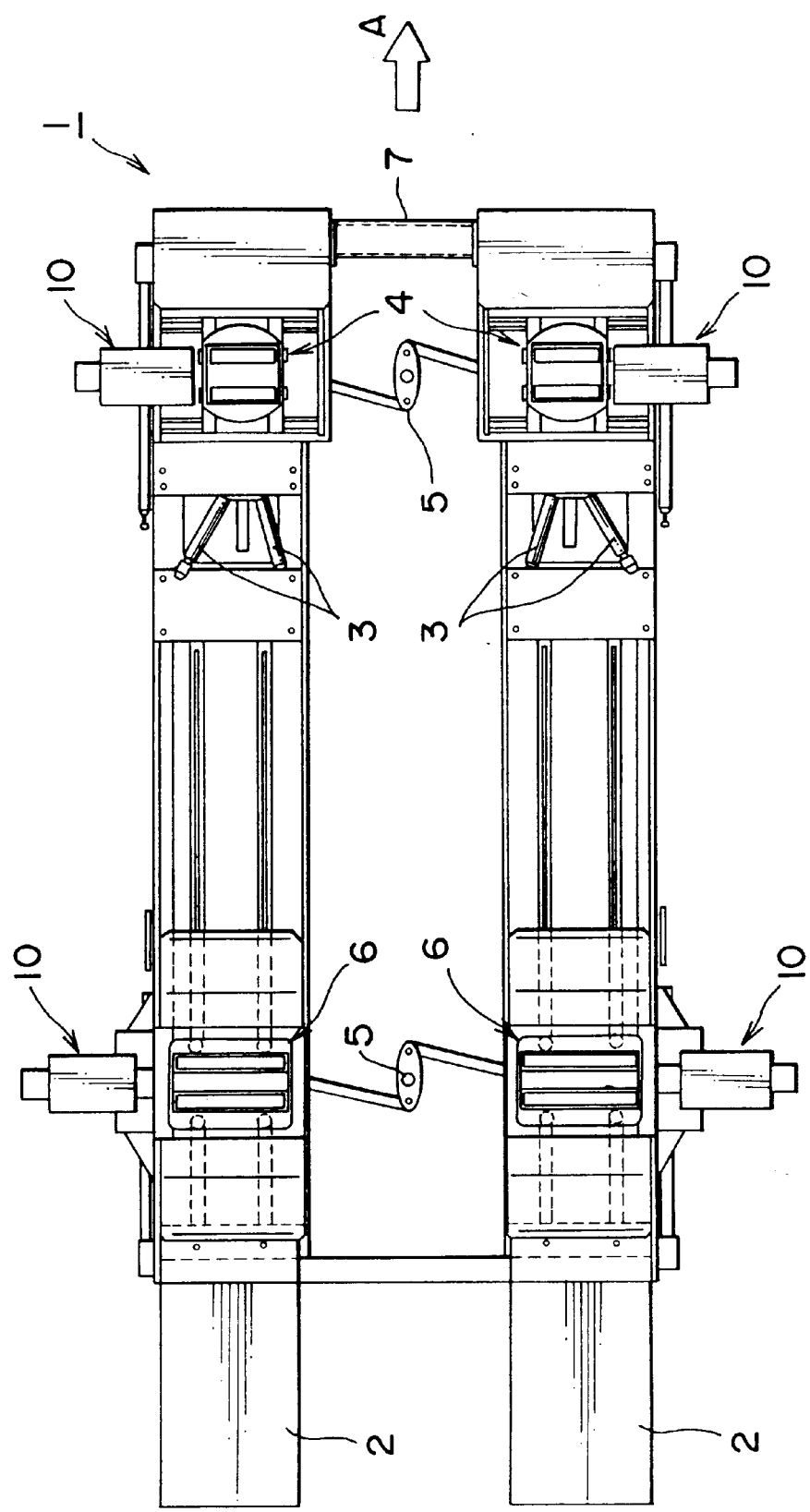
FIG. 1 is a plan view schematically illustrating a wheel alignment examination system constructed in accordance with one embodiment of the present invention.
Figure 2:
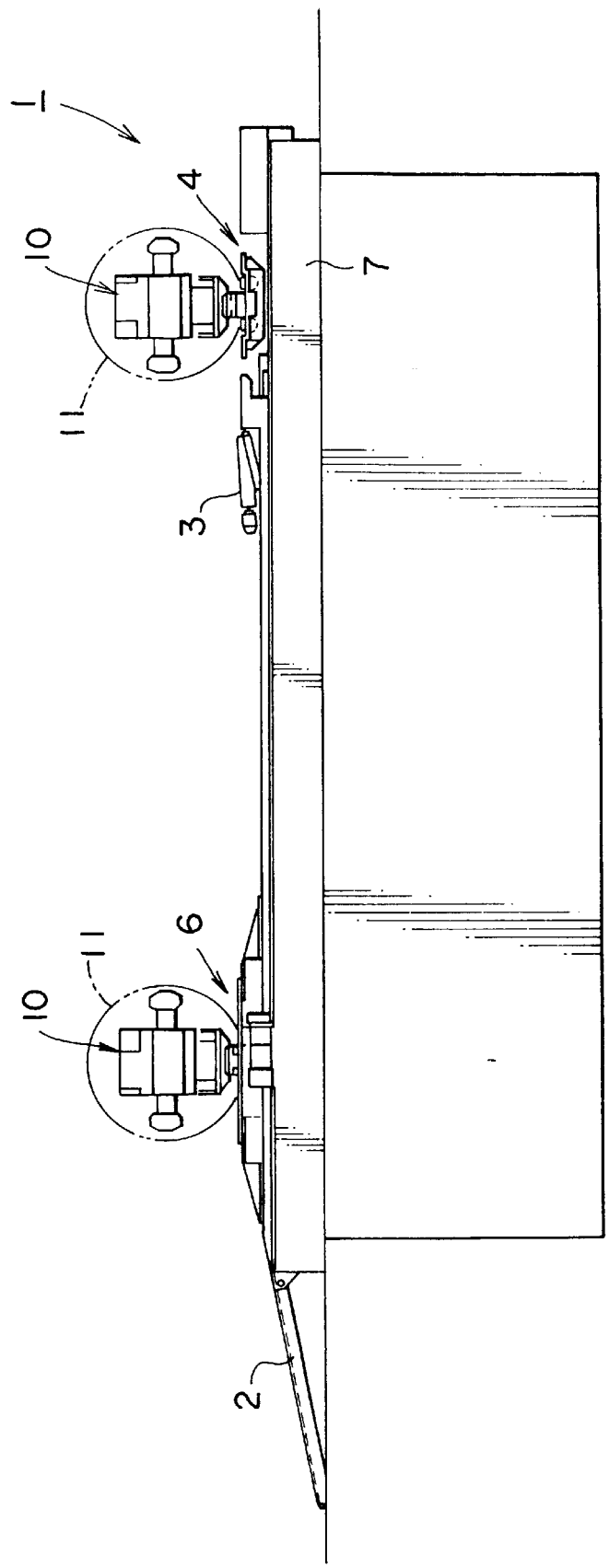
FIG. 2 is a side elevational view of the system shown in FIG. 1.

Referring now to FIG. 1, there is schematically shown in plan view a wheel alignment examining system 1 constructed in accordance with one embodiment of the present invention. FIG. 2 schematically illustrates the system in side elevational view. An automobile having a wheel to be examined travels in a direction indicated by arrow A and enters the present system 1 by running over a ramp 2. The examination system 1 includes a generally rectangularly shaped frame 7 on which are provided a pair of wheel support assemblies 4 for the front wheels of a vehicle, such as an automobile, and a pair of wheel support assemblies 6 for the rear wheels of the vehicle. A wheel guide 3 is provided integrally with the wheel support assembly 4 for the front wheel at its entrance side. The wheel support assemblies 4 for the front wheels are interconnected by a bell crank mechanism 5 so that the left and right wheel support assemblies 6 are always located symmetrically each other with respect to a center line of system 1. It may be so structured that the front and rear bell crank mechanisms 5 are operatively coupled to a drive device, such as a cylinder actuator, and the bell crank mechanisms 5 can be operated by the drive device to move the wheel support assemblies 4 and 6 in a transverse direction, i.e., in a direction perpendicular to a longitudinal axis (direction indicated by arrow A) of system 1. Of course, use may also be made of any other well-known left and right centering device, such as an equalizer, than the bell crank mechanism as described above.

Each of the wheel support assemblies 4 and 6 is provided with a wheel alignment examining apparatus 10 constructed in accordance with one embodiment of the present invention. The examining apparatus 10 will be described in detail later and it is to be noted that this examining apparatus may take any of various specific structures based on one or more of various features of the present invention depending on applications. As a common feature of the examining apparatus 10 constructed according to the present invention, there is provided a sensor member which is adapted to be pressed against an outer side surface of a wheel 11 to be examined supported on any of the wheel support assemblies 4 and 6. The sensor member is used to examine or measure a predetermined angle of a wheel to be examined and it rotates together with the wheel to be examined in unison as pressed against a side wall of a tire or a support wheel (in particular, its rim). As shown, the sensor member may have a shape in the form of an elongated plate or any other desired shape depending on its application.

Figure 3:
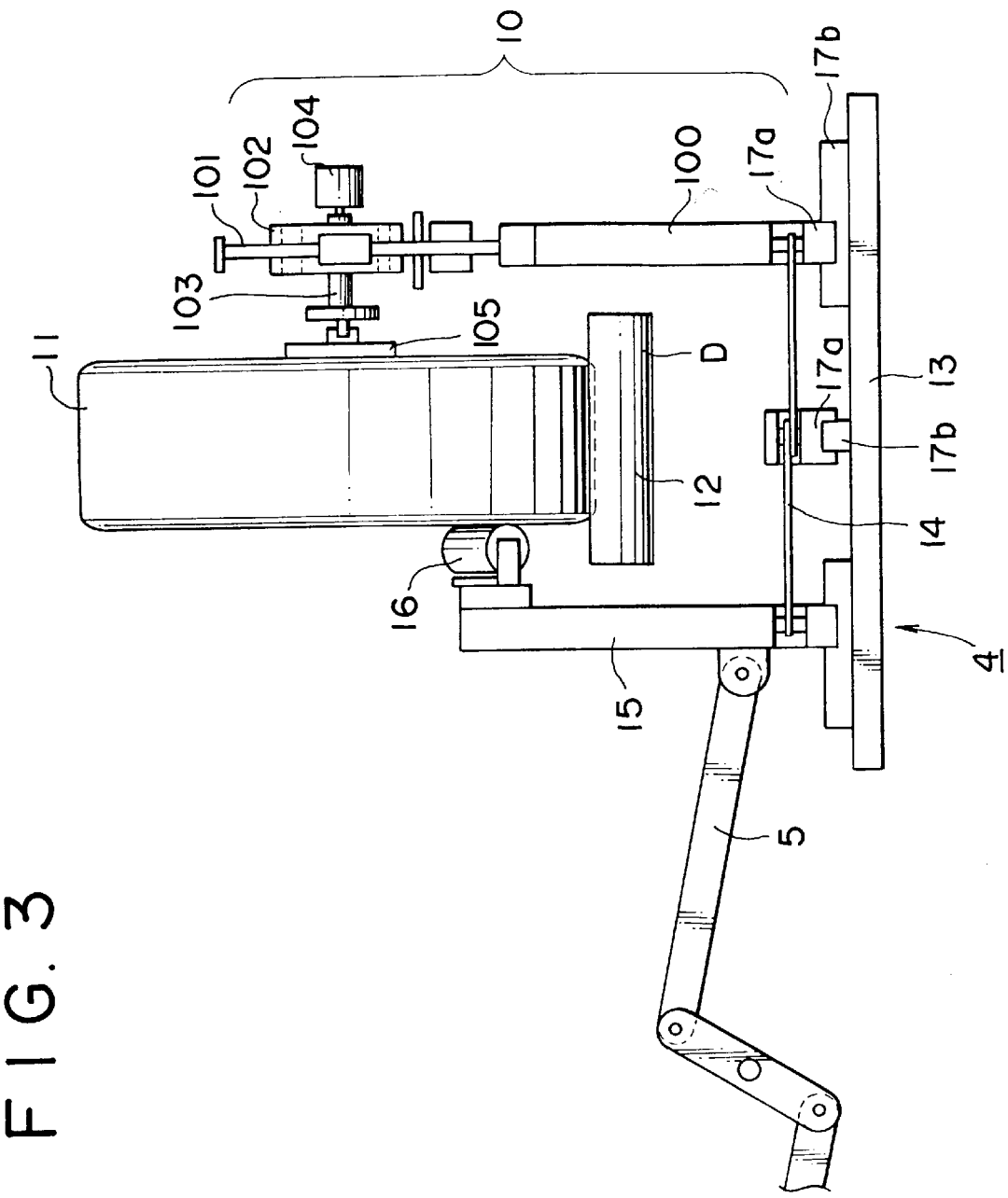
FIG. 3 is a front view schematically showing a wheel alignment examining apparatus constructed in accordance with one embodiment of the present invention.
Figure 4:
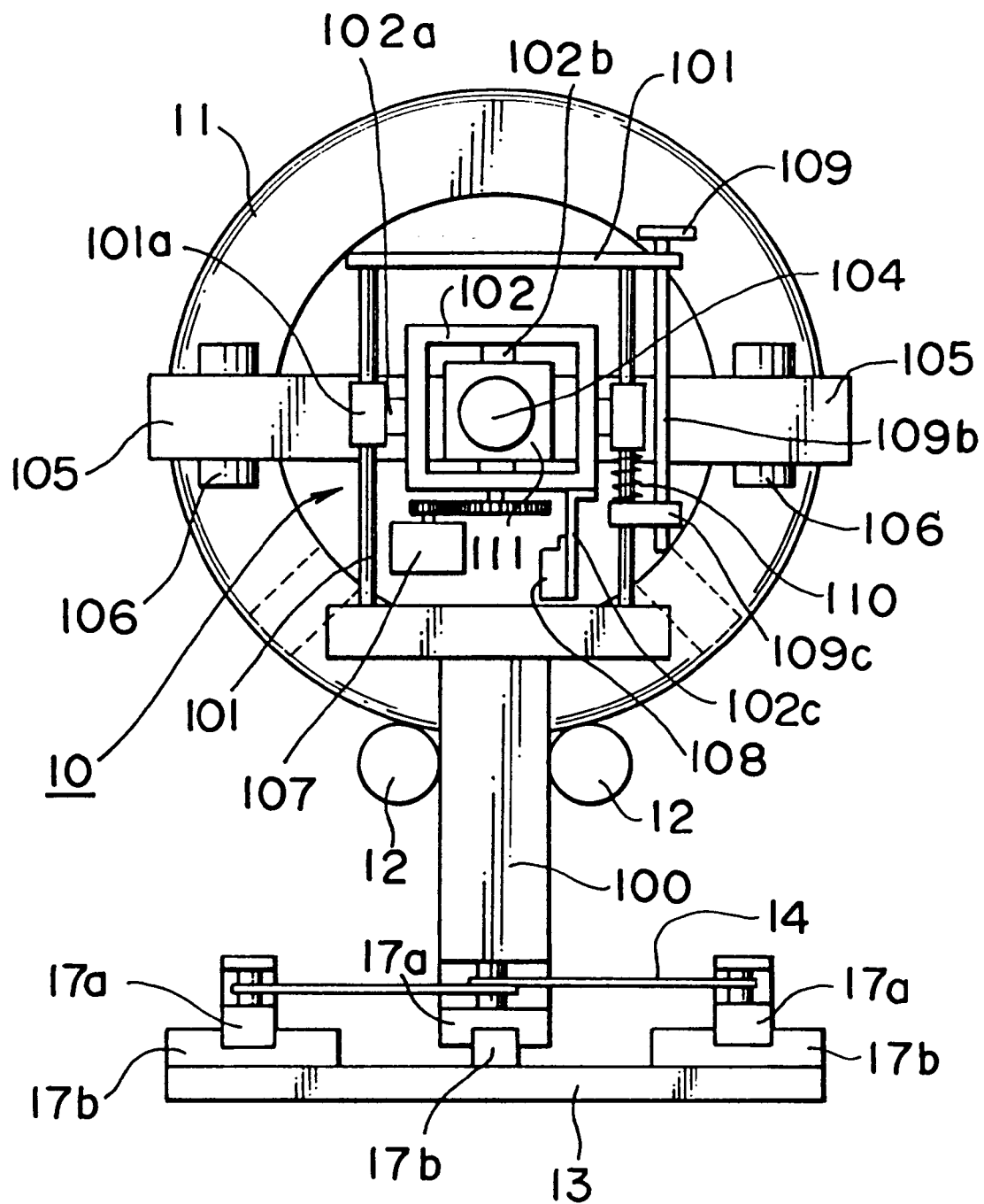
FIG. 4 is a side elevational view of the apparatus shown in FIG. 3.

A wheel alignment examining apparatus 10 constructed in accordance with one embodiment of the present invention is schematically shown in FIGS. 3 and 4. This examining apparatus 10 is provided on a base plate 13, constituting part of the wheel support assembly 4, to be movable closer to or separated away from a side surface of a wheel 11 to be examined supported on support rollers 12 through a linear motion guide mechanism comprised of a slider 17a and a rail 17b. That is, on the base plate 13 are provided four rails 17b arranged generally in the shape of a cross and a slider 17a is operatively coupled to each of the rails 17b slidably, whereby these four sliders 17a are operatively coupled by a pantagraph 14. The wheel alignment examining apparatus 10 is fixedly mounted on one (right slider 17a in FIG. 3) of these four sliders 17a. On the other hand, a clamp arm 15 is fixedly mounted on the slider 17a (left slider 17a in FIG. 3) located opposite to the one having mounted thereon the wheel alignment examining apparatus 10, and the clamp arm 15 carries a clamp roller 16 which may be brought into rolling contact with the inner side surface of wheel 11 to be examined. And, one end of the bell crank mechanism 5 is pivotally connected to the clamp arm 15. Accordingly, when the bell crank mechanism 5 is operated by a drive device, such as a cylinder actuator, the present examining apparatus 10 and the clamp roller 16 are brought closer together or separated away from each other through the operation of the pantagraph 14. For example, the bell crank mechanism 5 may be operated such that the present examining apparatus 10 and the clamp roller 16 are-brought closer together to thereby have them pressed against the opposite sides of wheel 11 to be examined, respectively. In the illustrated embodiment, in order to clamp the wheel 11 to be examined from both sides, provision is made of the clamp roller 16; however, it may also be so structured according to another embodiment of the present invention that only one side surface of the wheel 11 to be examined is pressed against by the present examining apparatus 10 without the provision of the clamp roller 16.

As shown in FIGS. 3 and 4, the illustrated examining apparatus 10 includes a sensor arm 105 elongated in shape as the sensor member of the present invention adapted to be pressed against the outer side surface of the wheel 11 to be examined. In the illustrated embodiment, the sensor arm 105 is fixedly provided with a sensor pad 106, which may be brought into contact with the side surface of the wheel 11 to be examined, at each end thereof. Thus, in the illustrated embodiment, the sensor arm 105 and the sensor pads 106 together define a sensor member of the present invention. In the illustrated embodiment, although it is shown that the sensor pad 106 is in contact with a side wall of the wheel 11 to be examined, i.e., a side wall of a tire, it may also be so structured that the sensor pad 106 is brought into contact with a support wheel itself, in particular its rim. Furthermore, although the sensor arm 105 is elongated in shape in the illustrated embodiment, it may take any of various other shapes than the elongated shape and various dimensions. As will be described later, the sensor arm 105 may have a structure which allows adjustment of its length in its longitudinal direction in one embodiment or a structure in which the sensor pad 106 may be set at any desired location along the longitudinal axis of the sensor arm 105 in another embodiment. With such a structure, the length of the sensor arm 105 itself or the location of the sensor pad 106 may be set desirably depending on the size and shape of the wheel 11 to be examined. Thus, even if the size and/or shape changes due to differences in the kind of support wheels or tires, the sensor member may be appropriately adjusted in length so as to fit to different kinds of support wheels and/or tires.

In the embodiment shown in FIGS. 3 and 4, the sensor arm 105 is fixedly attached to one end of a sensor shaft 103 approximately at its center position. The sensor shaft 103 extends through a housing 111 and is supported to be rotatable by the housing 111. The housing 111 is pivotally supported by a rectangularly shaped first frame 102 through a pair of pins 102b. That is, the housing 111 may pivot around a vertical axis defined by the pair of pins 102b provided at top and bottom of the housing 111 relative to the first frame 102. In addition, the first frame 102 pivotally coupled to holders 101a which are provided to be movable along vertical columns of a second frame 101 through a pair of pins 102*a* provided at right and left of the first frame 102. Thus, the first frame 102 is provided to be pivotal around a horizontal rotating axis defined by the pair of pins 102*a* relative to the second frame 101. Thus, the pins 102*b*, first frame 102, pins 102*a* and second frame 101 define a so-called Cardan suspension mechanism as the one used in a gyroscope. With the provision of such a Cardan suspension mechanism, the sensor shaft 103 is insured to have an invariable rotating center irrespective of the orientation of the first and second frames 102 and 101 so that the sensor shaft 103 can be oriented in any desired direction without constraints imposed by the first and second frames 102 and 101.

A rotary sensor (e.g., rotary encoder) 104 is operatively coupled to the sensor shaft 103 so that a rotary position of the sensor arm 105 and the wheel 11 can be determined by the rotary sensor 104. On the other hand, on the first frame 102 is provided an inclination angle sensor 107 capable of detecting a toe angle and the sensor 107 detects a change in angle of the sensor shaft 103 which moves horizontally relative to the first frame 102 via the pins 102*b*, thereby detecting the toe angle of wheel 11. A bracket 102*c* is provided integrally with and depending from the first frame 102 and an inclination angle detecting sensor 108 for detecting the camber angle of wheel 11 is mounted on the bracket 102*c*.

The second frame 101 is fixedly attached to a support block 100 generally in the shape of "T", and the block 100 is fixedly attached to one of the sliders 17*a*. In addition, a threaded rod 109*b* is provided in parallel with one of vertical columns of the second frame 101 and the threaded rod 109*b* is in a threaded engagement with a height regulating member 109*c* slidably mounted on the right-hand column of the second frame 101 as shown in FIG. 4. A spring 110 is interposed between the height regulating member 109*c* and the holder 110*a*. Thus, the height or vertical location of the sensor arm 105 can be adjusted and set by rotating a knob 109 provided at the top end of the threaded rod 109*b* so that the rotating center of the sensor shaft 103 can be brought into alignment with the rotating center of the wheel 11 to be examined.

Figure 5:
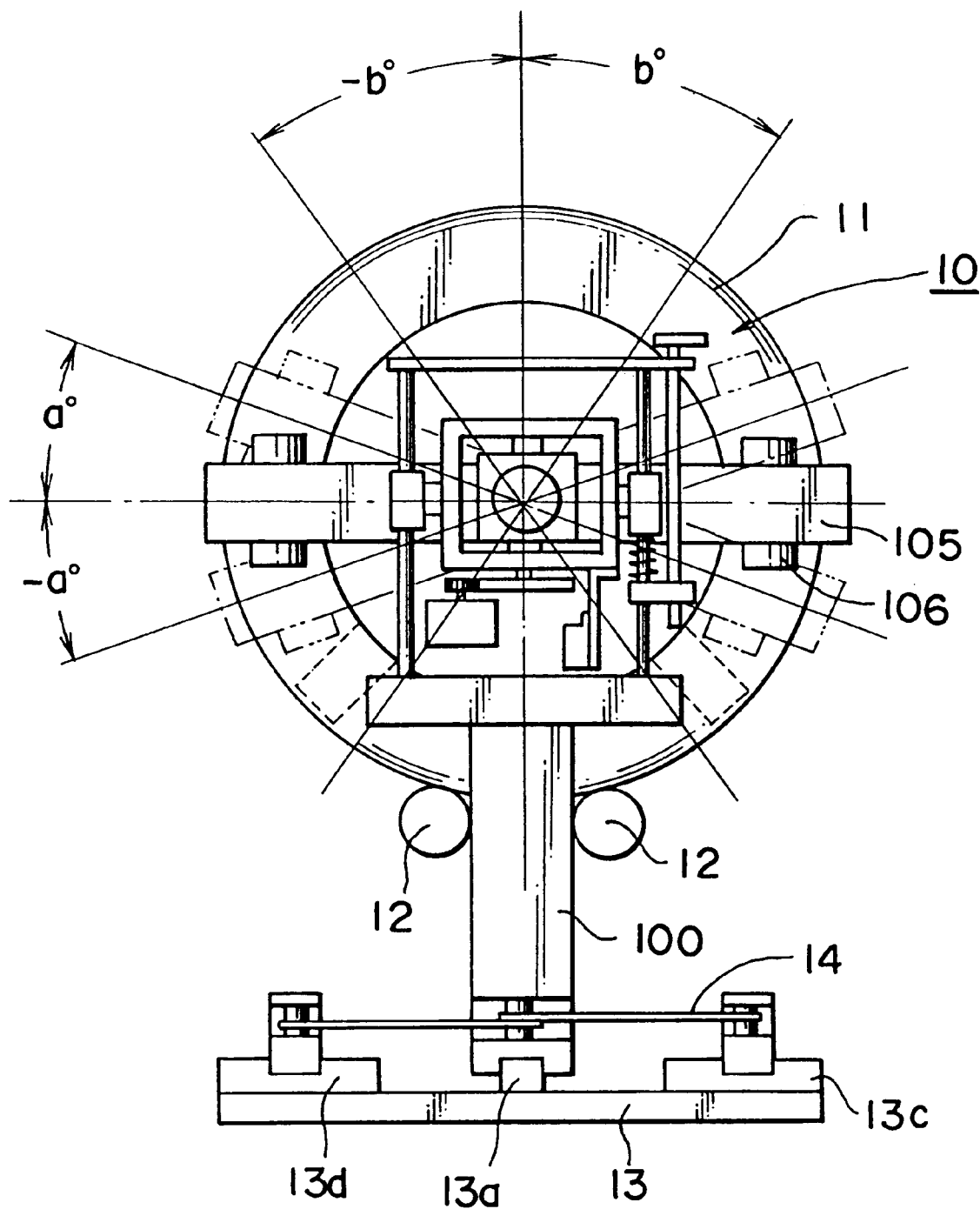
FIG. 5 is a schematic illustration useful for explaining the principle of operation of the apparatus shown in FIGS. 3 and 4.

Now, referring to FIG. 5, an operation of the wheel alignment examining apparatus shown in FIGS. 3 and 4 will be described. First, a wheel 11 to be examined is placed on the pair of support rollers 12. The height or vertical location of the sensor arm 105 is adjusted and set depending on the size and shape of the wheel 11 to be examined so as to bring the rotating center of the sensor shaft 102 in alignment with the rotating center of the wheel 11 to be examined as practically as possible. Then, the bell crank mechanism 5 is driven to move the sensor arm 105 toward a side surface of the wheel 11 to be examined until the sensor pads 106 are pressed against the side surface of the wheel 11 to be examined. Then, at least one of the support rollers 12 is driven to rotate to thereby rotate the wheel 11 to be examined during which the rotary position of the sensor arm 105 and thus the rotary position of the wheel 11 to be examined is detected by the rotary sensor 104. In addition, the inclination angle sensors 107 and 108 continuously detect respective inclination angles of the wheel 11 to be examined. Thus, a measured value from the inclination angle sensor 107 while the sensor arm 105 is located in a range of angles from −a° to +a° as determined by the rotary sensor 104 is read out as the toe angle, whereas, a measured value from the inclination angle sensor 108 while the sensor arm 105 is located in a range of angles from −b° to +b° as determined by the rotary sensor 104 is read out as the camber angle. In this case, it is possible to read out more than one toe and camber angles during respective ranges of angles and then to take averages, or, alternatively, it may be so structured to read out a single value at a predetermined angle in each of the ranges of angles. When an average is taken, it is possible to make the result less sensitive to error. As a further alternative, it is also possible to reverse the direction of rotation of the support rollers 12 so as to rotate the wheel 11 to be examined in the reverse direction to carry out the above-described toe and camber angle detecting operation.

Using the apparatus shown in FIGS. 3 and 4, the caster and king pin inclination angles of the wheel 11 to be examined can also be examined. That is, in such a case, in the first place, the support rollers 12 are set in a non-driven and floating condition. In other words, when set in this condition, the support rollers 12 and thus the wheel 11 to be examined supported thereon are set to be freely translatable and rotatable in a predetermined plane (i.e., a plane for supporting thereon the wheel 11 to be examined). Then, a steering wheel (not shown) of the automobile having the wheel 11 to be examined is steered over a predetermined angle to the left and to the right. While the steering wheel is being steered to the left and to the right over a predetermined angle, the amount of variation of the camber angle of the wheel 11 to be examined is measured using the inclination angle sensor 108. Then, using a formula well known for one skilled in the art and the measured amount of variation of the camber angle, the caster angle of the wheel 11 to be examined is calculated.

On the other hand, with the present apparatus, the king pin inclination angle can also be detected. In this case, while keeping the wheel 11 to be examined braked, for example, by stepping on a brake pedal, the steering wheel is steered to the left and to the right over a predetermined angle to have the wheel 11 to be examined changed in direction to the left and to the right over a predetermined angle. In this case, using the rotary sensor (encoder) 104, the king pin inclination angle of the wheel 11 to be examined can be detected. That is, since the support rollers 12 are maintained stationary and the brake is applied to the wheel 11 to be examined, the roll angle of the wheel 11 to be examined can be detected. In this case, the steered angle of the steering wheel is determined by a rotary sensor operatively coupled to the support rollers 12. In the case where the caster and king pin inclination angles are to be measured, the steering wheel is rotated over a predetermined angle to the left and to the right and as a result the wheel 11 to be examined is caused to move forward and backward. Under the circumstances, since the support rollers 12 are caused to move forward and backward in association therewith, it is preferable to structure such that the present examination apparatus 10 is movable forward and backward in synchronism with the forward and backward movement of the support rollers 12. It will be described later as to a structure for allowing the examination apparatus 10 to move forward and backward in synchronism with the forward and backward movement of the support rollers 12.

As set forth above, according to the wheel alignment examining apparatus shown in FIGS. 3 and 4, any one or more or all of the toe, camber, caster and king pin inclination angles of the wheel 11 to be examined can be detected automatically as well as continuously. In particular, since use is made of the sensor member, which is comprised of the sensor arm 105 and the sensor pads 106 and which is adapted to be pressed against the wheel 11 to be examined to rotate therewith in unison, detection can be carried out in sequence at arbitrary angular locations of the wheel 11 to be examined or over predetermined ranges of angles and thus detection can be carried out at high accuracy. In particular, detection accuracy can be enhanced significantly by detecting inclination angles over a predetermined range of angles.

Figure 6:
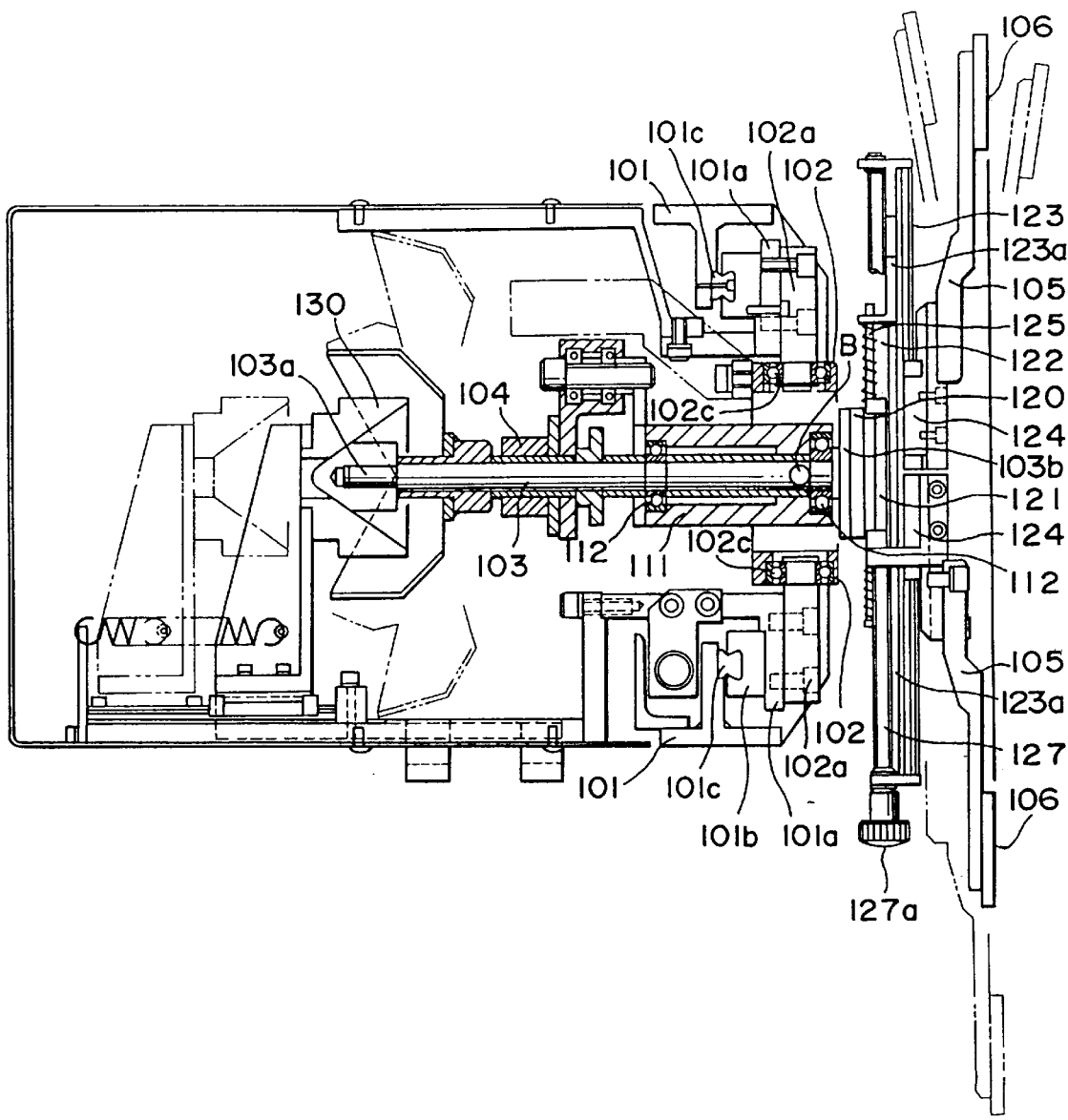
FIG. 6 is a plan view schematically showing a wheel alignment examining apparatus constructed in accordance with another embodiment of the present invention.
Figure 7:
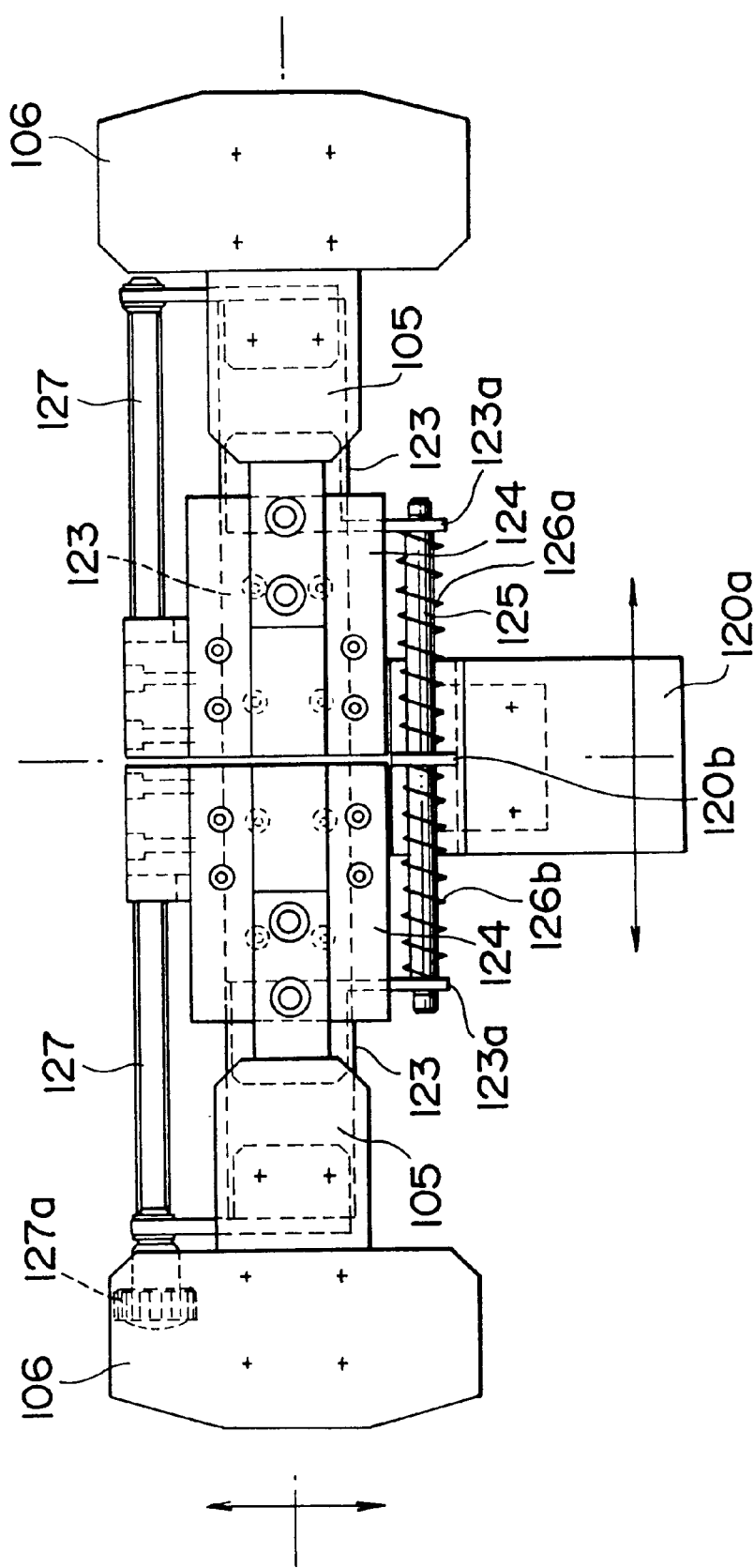
FIG. 7 is a front view schematically showing a sensor member used in the apparatus shown in FIG. 6.
Figure 8:
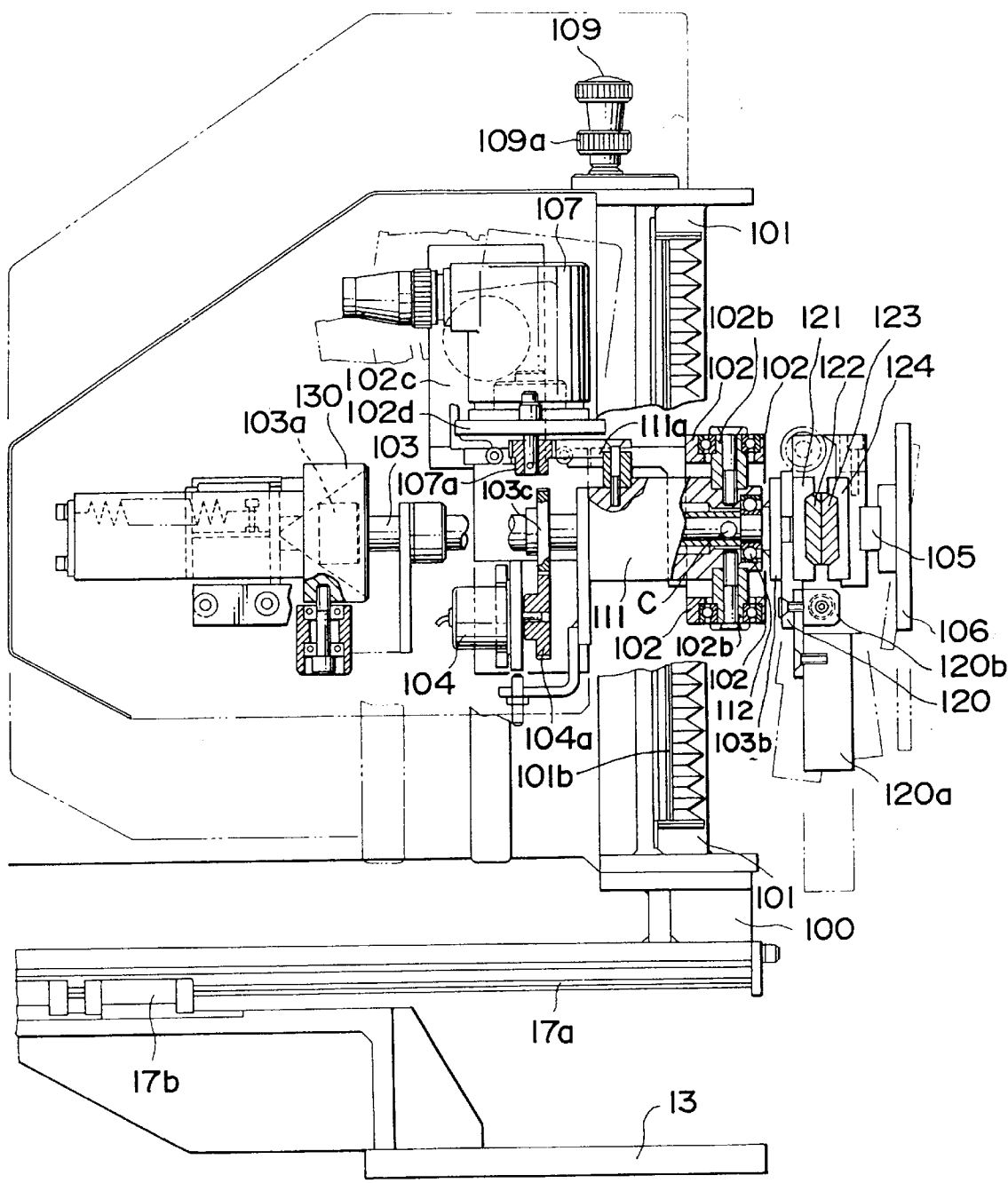
FIG. 8 is a side elevational view of the apparatus shown in FIG. 6.
Figure 9:
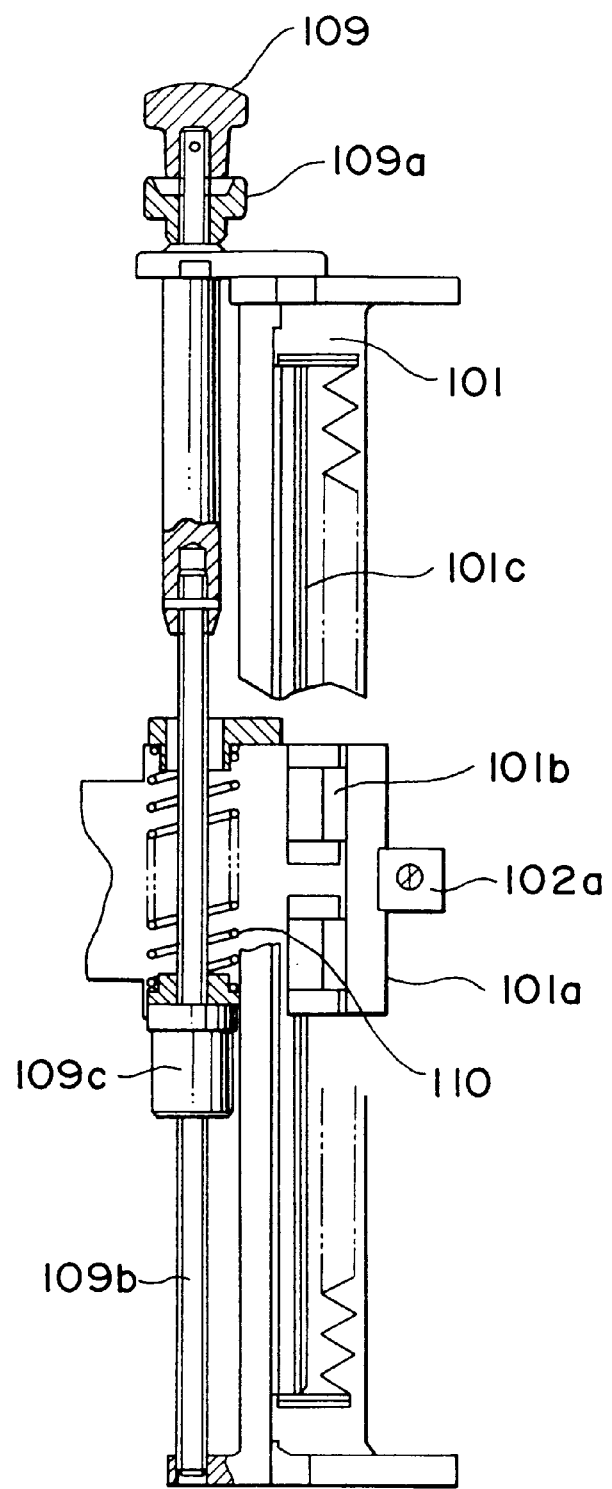
FIG. 9 is a schematic illustration showing somewhat on an enlarged scale a sensor member height adjusting mechanism incorporated in the apparatus shown in FIG. 6.
Figure 10:
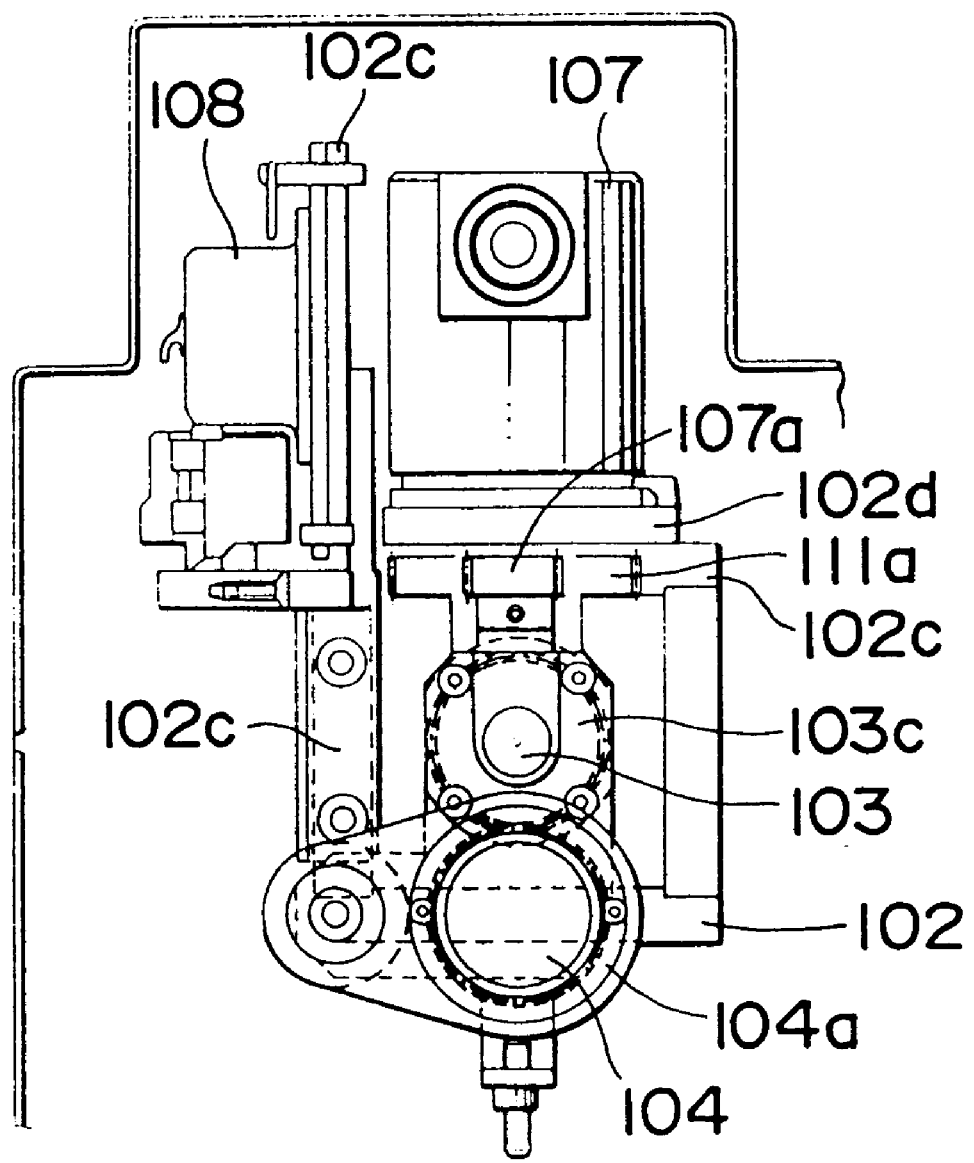
FIG. 10 is a schematic illustration showing the arrangement of three kinds of sensors incorporated in the apparatus shown in FIG. 6.

Now, referring to FIGS. 6 through 10, a specific embodiment of the present invention employing a Cardan suspension mechanism as shown in FIGS. 3 and 4 will be described in detail below. FIG. 6 is a plan view schematically showing this embodiment and FIG. 8 is its schematic side elevational view. FIG. 7 is a front view schematically showing a sensor member used in this embodiment and FIG. 9 is a schematic illustration showing a height adjusting mechanism of the sensor member in this embodiment. FIG. 10 is a schematic illustration showing a sensor unit including a rotary sensor 104, a toe angle sensor 107 and a camber angle sensor 108.

Referring first to FIGS. 6 and 7, in particular FIG. 7, a sensor member used in the present embodiment will be described. The present sensor member generally includes a pair of left and right sensor arms 105 and sensor pads 106, each fixedly attached to a tip end of each of the left and right sensor arms 105. The left and right sensor arms 105 are fixedly attached to respectively separate left and right sliders 124 which are slidably mounted on a rail 123 to thereby define a linear motion guide unit. A threaded rod 127 is provided rotatably and integrally with the rail 123 as extending in parallel with the rail 123, and a knob 127a is provided at one end of the threaded rod 127. The left and right sensor arms 105 have portions which are in threaded engagement with the threaded rod 127 so that when the knob 127a is grabbed to rotate the threaded rod 127 clockwise or counterclockwise, the left and right sensor arms 105 may be moved closer together or separated away from each other along the threaded rod 127 and the rail 123. With such a structure, the length of the sensor member can be adjusted so that the spaced distance between the sensor pads 106 can be set at a desired value depending on the size of the wheel 11 to be examined.

At the rear side of the rail 123 are fixedly attached a pair of brackets 123a spaced apart from each other over a predetermined distance and each having a portion projecting from one side of the sensor arm 105 over a predetermined length. And, a rod 125 is attached between these projecting portions of the brackets 123a with a pair of springs 126a and 126b inserted onto the rod 125. The rod 125 extends through a hole provided in a centering member 120b provided integrally with the sensor shaft 103 as shown in FIG. 8, and the centering member 120b is always located at the center of the rod 125.

Describing with particular reference to FIGS. 6 and 7, a rail 122 shorter in length than the rail 123 is fixedly attached to the rail 123 with their rear surfaces in contact. This rail 122 is slidably engaged with a slider 121 to thereby define another linear motion guide unit. The rail 121 is fixedly attached to a tip end 103b of the sensor shaft 103 through and together with a plate 120. The centering member 120b is fixedly attached to the bottom of the plate 120 and a weight 120a is also fixedly attached to the plate 120 as located below the centering member 120b. Thus, the sensor member (including the sensor arms 105 and the sensor pads 106 in this embodiment) is movable in a direction perpendicular to the center axis of the sensor shaft 103 relative to the sensor shaft 103 through a linear motion guide unit comprised of the slider 121 and the rail 122. However, since the weight 120a is provided, the sensor member is normally returned to its horizontally extending orientation, and, in addition, because of the recovery force of the left and right springs 126a and 126b, the center of the sensor member, i.e., the center of the left and right sensor arms 105, becomes aligned with the center of the sensor shaft 103. As a result, the left and right springs 126a and 126b have a function to have the sensor member returned to its original position along the longitudinal axis of the sensor member and the weight 120a has a function to have the sensor member returned to its original position in the direction of rotation of the sensor member around the rotating axis of the sensor shaft 103.

The sensor shaft 103 extends through a housing 111 and is rotatably supported by the housing 111 through a rotary bearing 112. As shown in FIG. 8, the housing 111 is generally cylindrical in shape and a pair of pins 102b are provided integrally with the housing 111 and extending radially in an opposed relationship. These pins 102b are rotatably supported by a generally rectangularly shaped first frame 102 through respective rotary bearings. That is, in FIG. 8, the housing 111 is supported to be rotatable around a rotating axis defined by the longitudinal axes of these pins 102b. In addition, as shown in FIG. 6, the first frame 102 has a top and a bottom beam each of which is provided with a rotary bearing 102c, into which a pin 102a is journaled. Thus, the first frame 102 is supported to be rotatable around a rotating axis defined by the longitudinal axes of the pair of oppositely arranged pins 102a. Moreover, the pins 102a are fixedly attached to a holder 101a which is coupled to a second frame 101 through a linear motion guide unit comprised of a slider 101b and a rail 101c. Thus, the holder 101a and the pins 102a may move in the vertical direction (in a direction vertical to the plane of the drawings of FIG. 6) relative to the second frame 101.

It should thus be noted that the so-called Cardan suspension mechanism is defined by the first frame 102, the second frame 101 and the pins 102a and 102b and the sensor shaft 103 may be oriented in any desired direction. The Cardan suspension mechanism is a suspension mechanism typically used in a gyroscope so that the sensor shaft 103, which can be oriented in any desired direction because of the function of the Cardan suspension mechanism constructed as described above, has an invariant center position indicated as B in FIG. 6 and as C in FIG. 8. That is, no matter which direction the sensor shaft 103 is oriented, it always passes through this invariant center position.

A projection 103a is formed at the rear end of the sensor shaft 103 and an original position returning mechanism 130 is provided to be engageable with the projection 103a. As indicated by the phantom lines in FIG. 6, the original position returning mechanism 130 is movable over a predetermined distance between its forward and retracted positions and it is provided with a receiving section which substantially corresponds in shape to the projection 103a. Thus, when the original position returning mechanism 130 is moved to its advanced position to have its receiving section engaged with the projection 103a, the sensor shaft 103 is returned to its original position.

Now, with particular reference to FIG. 9, a height adjusting mechanism for adjusting the height or vertical location of the sensor arm will be described. As shown in FIG. 9, a threaded rod 109b is provided rotatably and integrally with the second frame 101 as extending vertically. A knob 109 is provided at the top end of the threaded rod 109b and a lock nut 109a is disposed below the knob 109. A height regulating member 109c is threaded onto the threaded rod 109b. A rail 101c of a linear motion guide unit is fixedly attached to a vertical column of the second frame 101 and a slider 101b is slidably mounted on the rail 101c. The slider 101b is fixedly attached to a holder 101a which is fixedly attached to the pin 102a. A spring 110 is onserted onto the threaded rod 109b and rests on the height regulating member 109c and the slider 101b rests on the spring 110. Thus, when undesired forces are applied to the sensor member from the wheel 11 to be examined in the vertical direction, they may be absorbed by the spring 110.

Now, with particular reference to FIG. 10 along with FIGS. 6 and 8, a sensor unit of the present embodiment will be described. First, referring to FIG. 8, a first bracket 102c is provided fixedly attached to and integrally with the first frame 102 and a camber angle measuring inclination angle sensor 108 is mounted on a side surface of a vertically extending portion of the first bracket 102c. In the case where the camber angle of the wheel 11 to be examined is to be detected, measurements are carried out with the sensor member oriented in the vertical direction, and, in this case, the sensor shaft 103 is oriented in a direction perpendicular to the longitudinal axis of the inclined sensor member, whereby the housing 111 and the first frame 102 are also oriented similarly with the sensor shaft 103, so that the camber angle of the wheel 11 to be examined can be detected or measured by the sensor 108. Moreover, a second bracket 102d is fixedly attached and thus integrally with the first frame 102 and a toe angle detecting inclination angle sensor 111a is mounted on the second bracket 102d. On the other hand, a sector gear 111a is provided integrally with the housing 111 and this sector gear 111a is in mesh with a gear 107a of the toe detecting inclination angle sensor 107. In addition, a gear 103c is fixedly attached to the sensor shaft 103 and this gear 103c is in mesh with a gear 104a of a rotary sensor 104 fixedly attached to a rearward extension of the housing 111. Thus, the rotary position of the sensor shaft 103 can be determined by the rotary sensor 104.

In the above-described embodiment shown in FIGS. 6 through 10, since there are provided the rotary sensor 104 for detecting the rotary position of the sensor member, the inclination angle sensor 107 for detecting the toe angle of the wheel 11 to be examined and the inclination angle sensor 108 for detecting the camber angle of the wheel 11-to be examined, any one or more of the toe, camber, caster and king pin inclination angles with respect to alignment of the wheel 11 to be examined can be detected selectively or in sequence. It is to be noted, however, that, if it is only necessary to detect any selected one or more among these various inclination angles depending on applications, it is possible to omit one or more of these sensors. For example, in the case where it is desired to build a wheel alignment examining apparatus for detecting only the toe angle of a wheel of an automobile, then it is possible to provide only the rotary sensor 104 and the toe angle detecting sensor 107 without provision of the camber detecting sensor 108. It is also to be noted that the operation of the above-described embodiment is substantially identical to the operation described with reference to FIGS. 2 through 4 so that its detailed description of the operation is omitted.

Figure 11:
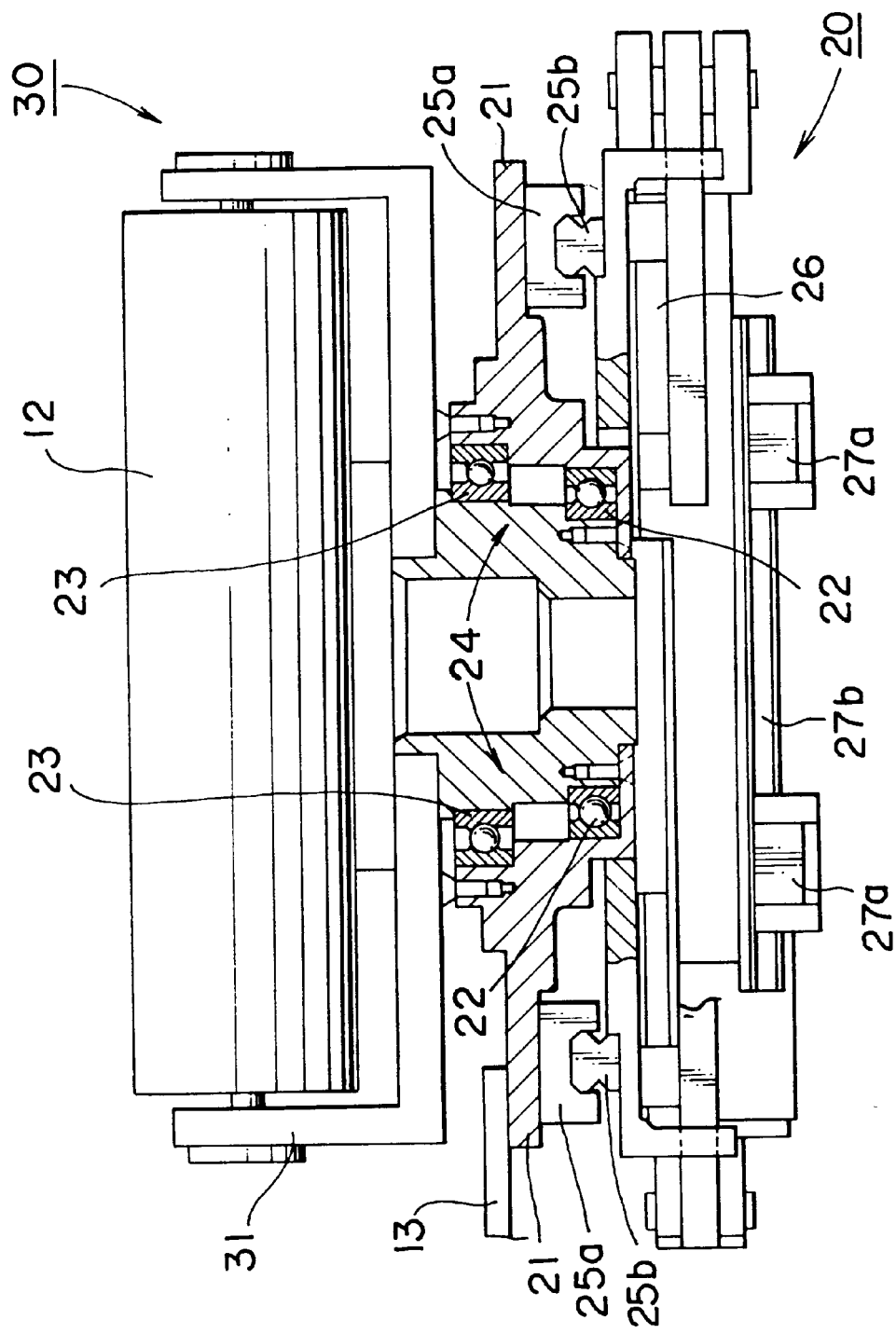
FIG. 11 is a front view schematically showing a roller support assembly suitable for use in the present apparatus.

Now, with particular reference to FIGS. 11 through 13, a support roller assembly of support rollers 12 suitable for use in a wheel alignment examining apparatus of the present invention will be described. As shown in FIG. 11, the support roller assembly generally has a two-part structure, including a roller support unit 30, which defines the upper half of the support roller assembly, and a table support unit 20, which defines the lower half of the assembly. First, describing the table support unit 20 with particular reference to FIG. 12, the table support unit 20 fundamentally includes a first slide table 21 and a second slide table 26 disposed below the first slide table 21. The first slide table 21 is formed with a hole 21a at its center, in which mounted are a first rotary bearing 22 and a second rotary bearing 23 so as to hold a rotary member 24 rotatably around a rotating axis defined by the first and second rotary bearings 22 and 23. As shown in FIG. 13, the rotary member 24 is fixedly attached to a bottom surface of a roller carrier 31 which supports a pair of support rollers 12 rotatably. Thus, the support rollers 12 are supported to be rotatable around a vertical axis relative to the first slide plate 21.

On the other hand, the first slide table 21 is arranged on a second slide plate 26 through four sets of linear motion guide units, each comprised of a slider 25a and a rail 25b. Thus, the first slide plate 21 is translationally movable relative to the second slide plate 26 through these four linear motion guide units in the straight direction determined by the longitudinal axes of the rails 25b. The second slide plate 26 is mounted, for example, on the system frame 7 shown in FIG. 1 through an appropriate number of linear motion guide units, each comprised of a slider 27a and a rail 27b. As a result, the first slide plate 21 is translationally movable in any direction within a horizontal plane relative to the system frame 7. It should thus be noted that the support rollers 12 are also translationally movable in any direction within a horizontal plane. Since the support rollers 12 are translationally movable in any direction as well as rotatable around a vertical axis, they are set in a floating state when unlocked.

Figure 12:
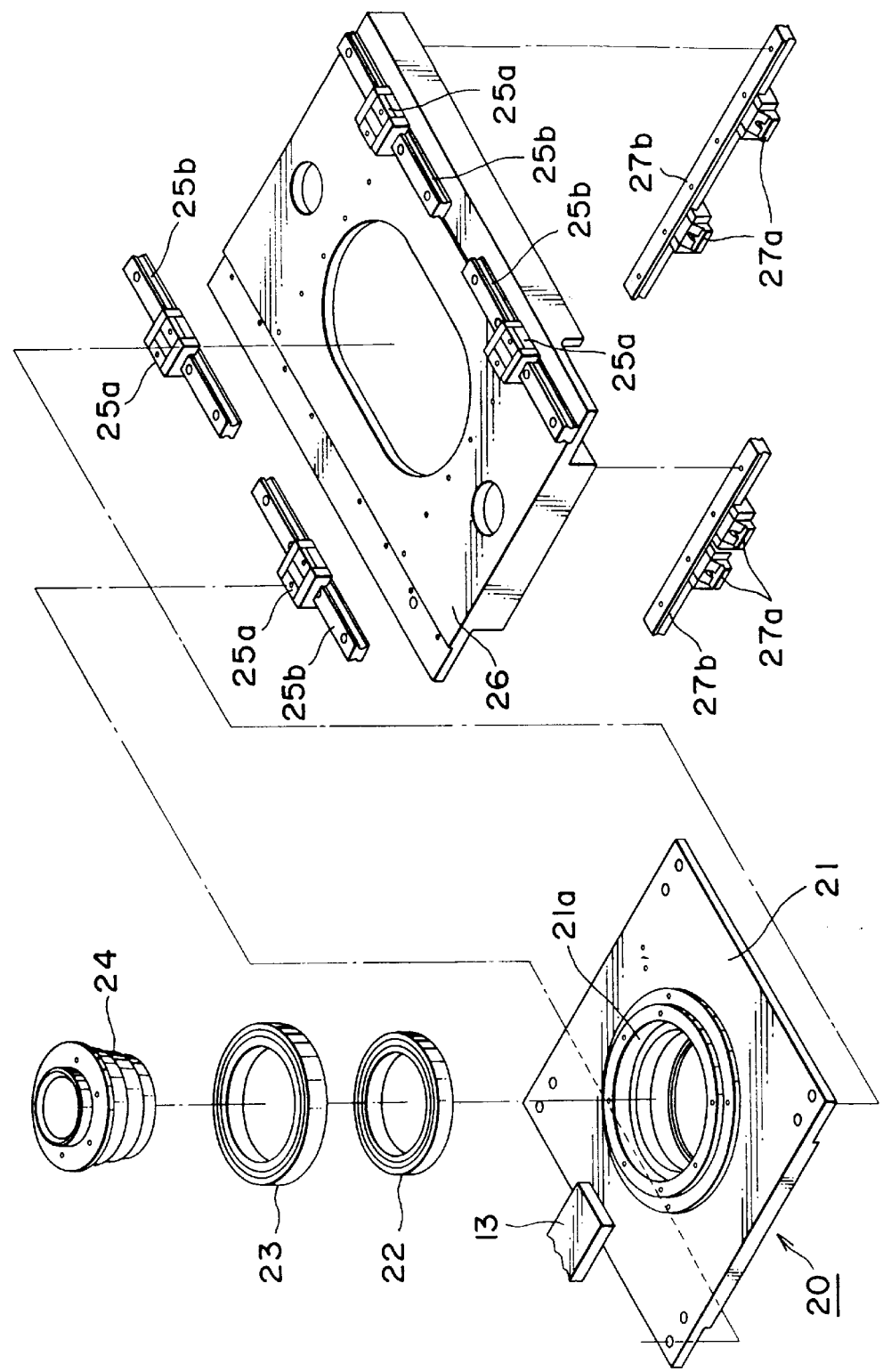
FIG. 12 is an exploded, perspective view schematically showing a table unit of the roller support assembly shown in FIG. 11.
Figure 13:
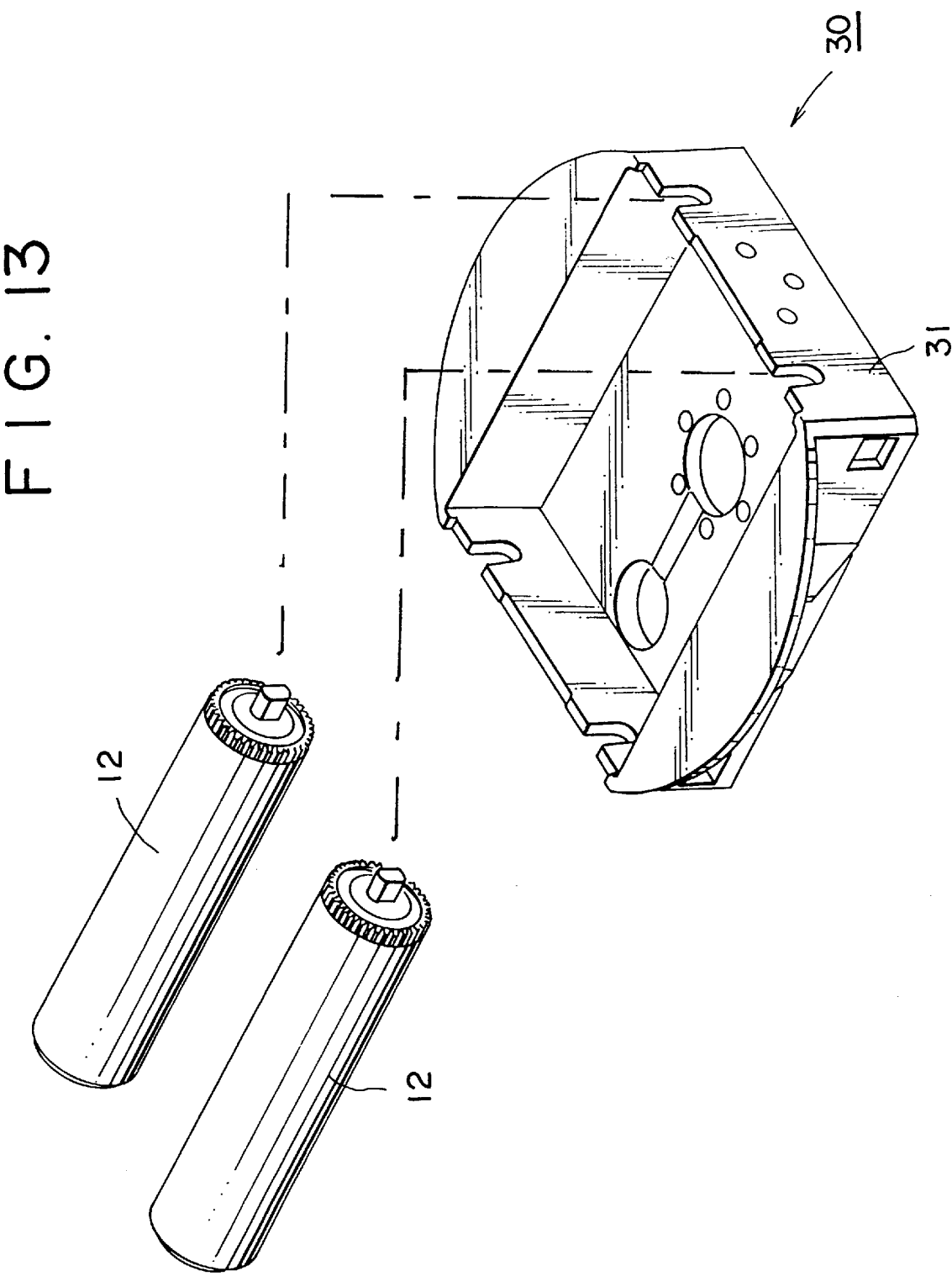
FIG. 13 is an exploded, perspective view schematically showing a roller unit of the roller unit assembly shown in FIG. 11.

As shown in FIGS. 11 and 12, in one embodiment of the present invention, the base plate 13 of the present wheel alignment examining apparatus is fixedly attached on the first slide plate 21. For example, in the wheel alignment examining apparatus shown in FIG. 8, the support block 100 for supporting the second frame 101 is mounted on the base plate 13 through linear motion guide units, each comprised of a slider 17a and a rail 17b. As shown in FIG. 3, the support block 100 is coupled to the bell crank mechanism 5 through the pantograph 14 or directly. The reason why the base plate 13 is mounted on the first slide plate 21 in this manner resides in the fact that, when the steering wheel is turned or steered over a predetermined range of angles to the left and to the right so as to detect the caster and/or king pin inclination angles as described above, the wheel 11 to be examined moves forward and backward slightly and thus this movement of the wheel 11 to be examined needs to be compensated for. Described more in detail in this respect, when the steering wheel is turned or steered either to the left or to the right, the wheel 11 to be examined is caused to move forward or backward around its king pin from the current position. As a result, the center of the wheel 11 to be examined also moves forward or backward. As a result, if the present wheel alignment examining apparatus 10 maintained its current position, then undesired forces would be produced between the wheel 11 to be examined and the sensor member pressed against the wheel 11 to be examined, which could be a source of errors. Accordingly, such errors can be minimized by compensating for the movement of the wheel 11 to be examined by moving the sensor member in association with the forward or backward movement of the wheel 11 to be examined caused by the rotation of the steering wheel. In accordance with the present embodiment, since the first slide table 21 is translationally movable in the forward and backward directions, the present examining apparatus 10 is mounted on the first slide table 21 so that the forward or backward movement of the wheel 11 to be examined caused by turning the steering wheel can be automatically compensated for.

It should also be noted that to provide a structure for allowing the support (the base plate 13 being a part thereof in the above-described embodiment) which supports the sensor member pressed against one side surface of the wheel 11 to be examined to be movable in the forward and backward directions of the present examination system by having the support fixedly attached to the first slide plate 21 is not only for providing enhanced accuracy in detecting the caster and king pin inclination angles. That is, in a vehicle, such as an automobile, the wheel base may differ between the right wheels and the left wheels, in which case, at least either of the sensor member or the support of the sensor member should be provided to be movable in the forward and backward directions of the examining system so as to absorb such errors in the wheel base between the left wheels and the right wheels. Thus, in general, even in the case of detecting the toe and camber inclination angles, it is preferable to provide the sensor member to be freely movable in the forward and backward directions so as to establish a condition in which the center of the sensor member is in registry with the center of rotation of the wheel 11 to be examined as much as possible. From such a viewpoint, in accordance with this aspect of the present invention, the sensor member may take a structure in which it rotates together with the wheel 11 to be examined as pressed thereagainst as described above or any other prior art structure in which an inclination angle of the wheel 11 to be examined is detected by simply pressing the sensor member against one side surface of the wheel 11 to be examined. For example, as the sensor member in this case, use may, for example, be made of a roller as in the prior art, or use may also be made of the conventional clamp type. It should also be noted that the structure for supporting either of the sensor member or the sensor member support movable in the forward and backward directions should not be limited to the above-described case of fixed attachment to the first slide plate 21, and, of course, any other structure can also be used as long as the sensor member is supported to be movable in the forward and backward directions of the examining system when the sensor plate is kept pressed against one side surface of the wheel 11 to be examined.

Referring now to FIGS. 14 through 19, a wheel alignment examining apparatus constructed in accordance with a further embodiment of the present invention will be described. The fundamental characteristic of this embodiment resides in the use of a link mechanism operatively coupled to a sensor member as compared with the previously described embodiment which used the Cardan suspension mechanism.

In the first place, referring to FIGS. 14 and 15, a sensor member used in the present embodiment will be described in detail. The sensor member of the present embodiment includes a sensor arm 105 comprised of a rail of a linear motion guide unit, and sliders 202a are slidably mounted on the sensor arm 105. A plate 202 is fixedly attached to the slider 202a and a pair of rails 203b, each defining part of a linear motion guide unit, is fixedly attached to the plate 202 extending in a direction transverse to the longitudinal direction of the sensor arm 105. A slider 203a is slidably mounted on each of the pair of rails 203b and a sensor pad 106 is fixedly attached to these sliders 203a. An auxiliary pad 106a having a predetermined shape is fixedly attached to the sensor pad 106. As best seen in FIG. 15, a guide rod 201 extends in parallel with the sensor arm 105 and held in position by a holding member 208, and a bracket 204 formed with holes through which the guide rod 201 extends is fixedly attached to the plate 202. At the center of the bracket 204 is provided a centering member and a knob 204a in a threaded engagement therewith. And, a pair of left and right springs 205a and 205b are inserted onto the rod 201 and located between the left end of the bracket 204 and the centering member and the centering member and the right end of the bracket 204, respectively. Moreover, a pair of springs 207a and 207b are provided extending between the sensor pad 106 and the plate 202 such that the sensor pad 106 is urged in opposite directions by these springs in a direction parallel with the longitudinal axes of rails 203b.

Thus, in the present embodiment, the mounting position of either of the left and right sensor pads 106 of the sensor member may be determined at a desired location by first slackening the knob 204a, moving the bracket 204 along the rod 201 to a desired location and then tightening the knob 204a. The sensor pad 106 may be shifted in position in the longitudinal axis of the sensor arm 105 against the spring forces of either of the pair of springs 207a and 207b so that there is provided an original position returning function for the sensor pad 106. With this structure, when detection of an inclination angle is to be carried out by bringing the sensor pad 106 and/or auxiliary pad 106a in contact with a side surface of a wheel to be examined, undesired forces can be prevented from being produced between the sensor pad 106 and/or auxiliary pad 106a and the wheel to be examined so that errors can be prevented from being produced.

Figure 14:
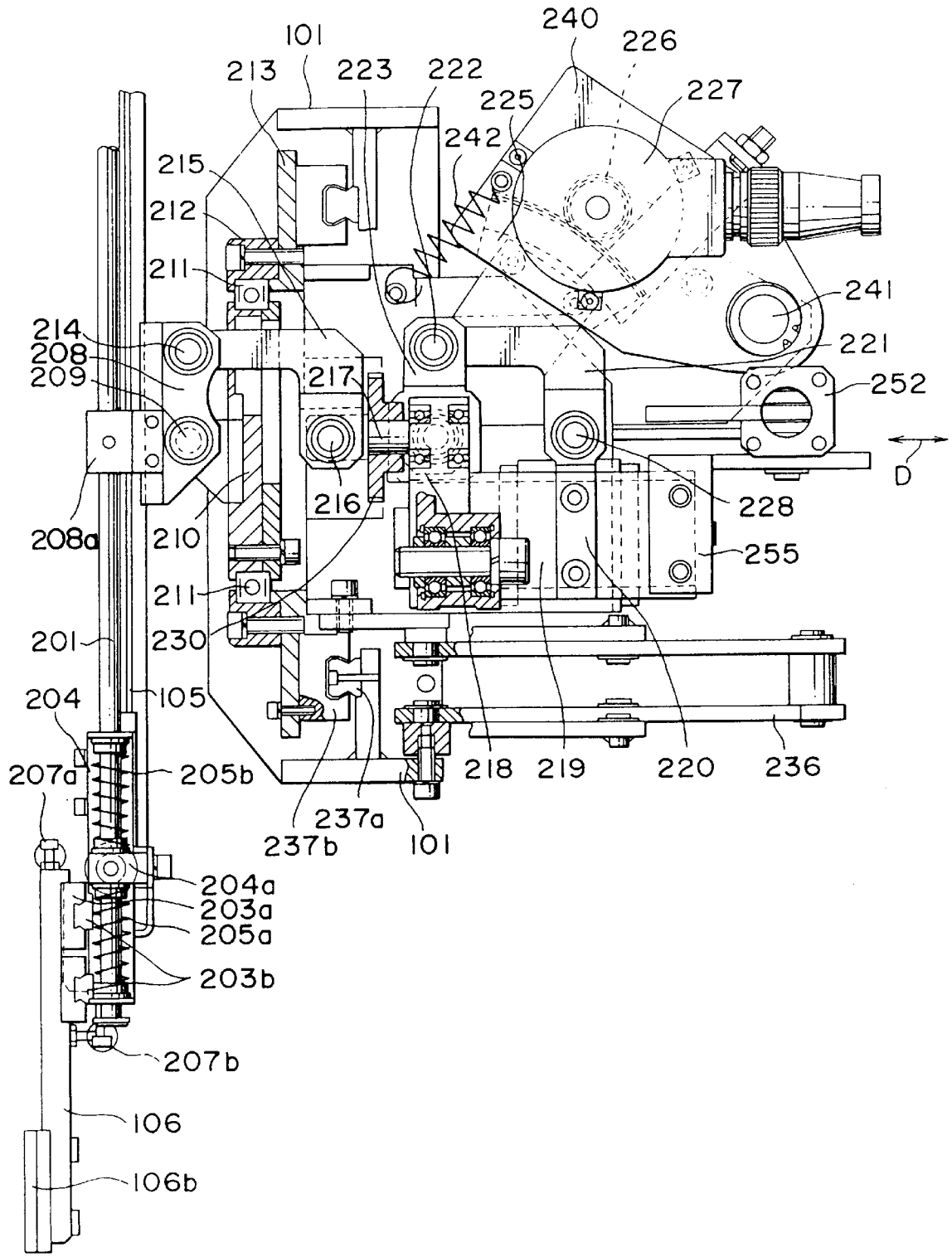
FIG. 14 is a plan view schematically showing part of a wheel alignment examining apparatus constructed in accordance with a further embodiment of the present invention.

Now, with particular reference to FIG. 14, a first link member 208 of the link mechanism is fixedly attached to the sensor arm 105 by means of a mounting member 208a. The first link member 208 is connected to a rotary member 210 through a first rotary shaft 209. The rotary member 210 is rotatably supported by a holder 213 through a rotary bearing 211. The holder 213 is supported by a second frame (casing in the present embodiment) 101 through a linear motion guide unit comprised of a slider 237b and a rail 237a. Thus, the holder 213 is movable in the vertical direction relative to the second frame 101 through a linear motion guide unit 237, and, as will be described later, its position in the vertical direction can be set at a desired location.

On the other hand, the first link member 208 is connected to an L-shaped second link member 215 through a second rotary shaft 214, and the second link member 215 is connected to a linearly shaped third link member 217 through a third rotary shaft 216. Through these first through third link members, a change in the angle of the sensor arm member (i.e., a displacement in a direction perpendicular to the rotating direction of a side surface of a wheel to be examined) is converted into a linear change of the third link member 217. The third link member 217 is rotatably supported by a housing through a rotary bearing 218 and the housing is fixedly attached to a bracket 219 which executes a linear motion in the direction indicated by arrow D. The bracket 219 is fixedly attached to a rail 245b (see FIG. 16) of a linear motion guide unit and the rail 245b is in slidable engagement with a slider 245a (see FIG. 16). On the bracket 219 is mounted another bracket 220 which is connected to a fourth link member 221 through a fourth rotary shaft 228. Moreover, the fourth link member 221 is coupled to a fifth link member 223 through a fifth rotary shaft 222 (see FIG. 14). The fifth link member 223 is integrally coupled to a sector gear 225 through a sixth rotary shaft 224 (see FIG. 16). On the other hand, a bracket 240 is provided to be rotatable by the rotary shaft 241 and an encoder 227 is mounted on the bracket 240 for detecting toe and camber angles. The encoder 227 has a gear which is in mesh with the sector gear 225, and the bracket 240 carrying thereon the encoder 227 is urged by a spring 242 in a direction such that the gear 226 and the sector gear 225 are always kept in mesh. In the present embodiment, since a displacement of the sensor member in a direction perpendicular to the rotating direction of the wheel to be examined is converted into a motion in a plane by using a link mechanism, the toe and camber angles of the wheel to be examined can be determined by using the common encoder 227 and detecting the rotary position of the sensor member.

Figure 16:
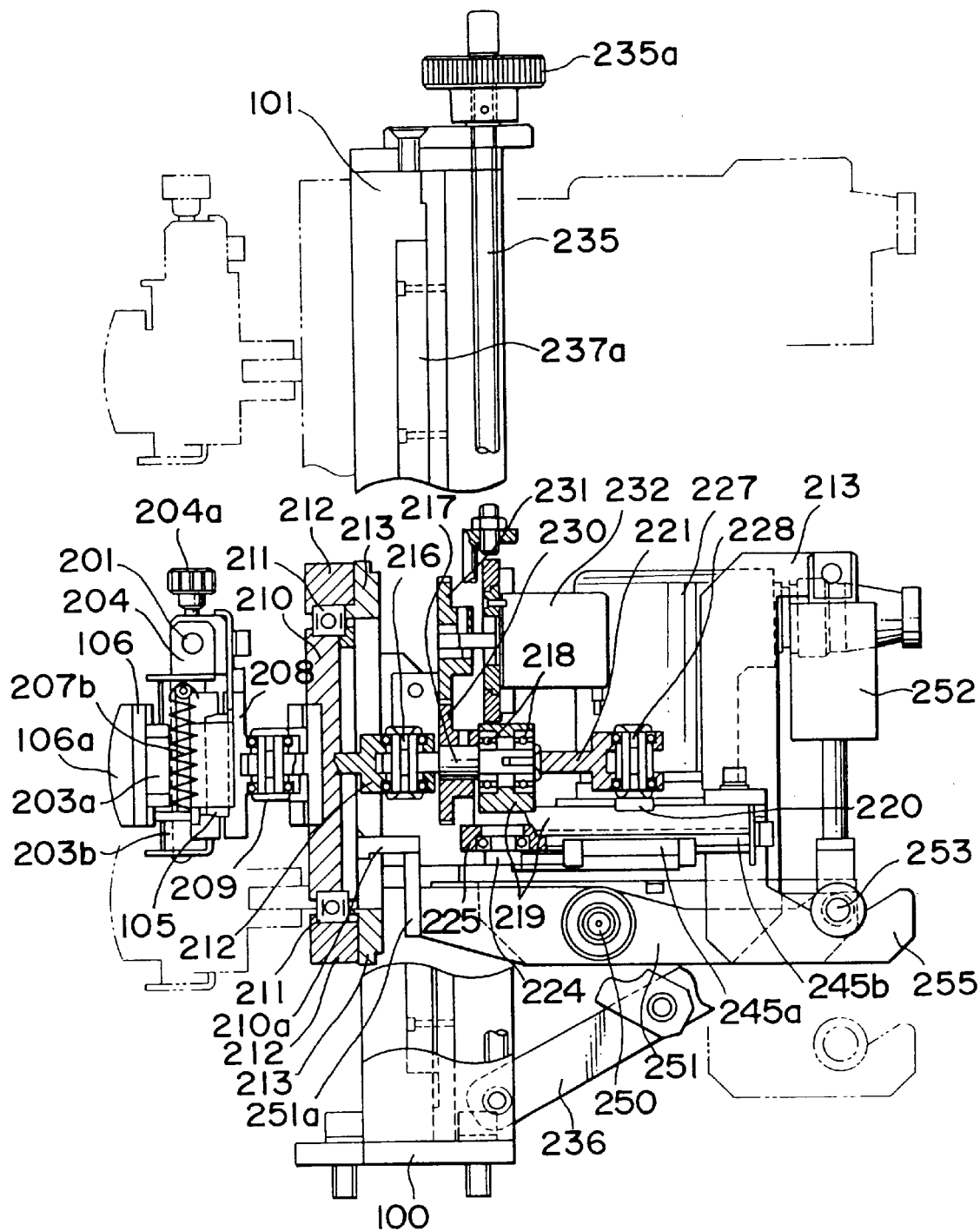
FIG. 16 is a side elevational view of the apparatus shown in FIG. 14.

Now, with particular reference to FIG. 16, a structure for detecting the rotary position of the sensor member (i.e., wheel 11 to be examined) will be described. As shown in FIG. 16, a gear 230 is provided integrally with the third link member 217 and this gear 230 is in mesh with a gear 231 of a rotary sensor 232. Thus, the rotary position of the sensor member can be detected at all times by the rotary sensor 232. In this manner, in the present embodiment, even in the case where all of the toe, camber, caster and king pin inclination angles are to be detected, detection can be carried out using only two encoders 227 and 232, so that the number of encoders used is reduced as compared with the previous case which used three encoders.

Figure 17:
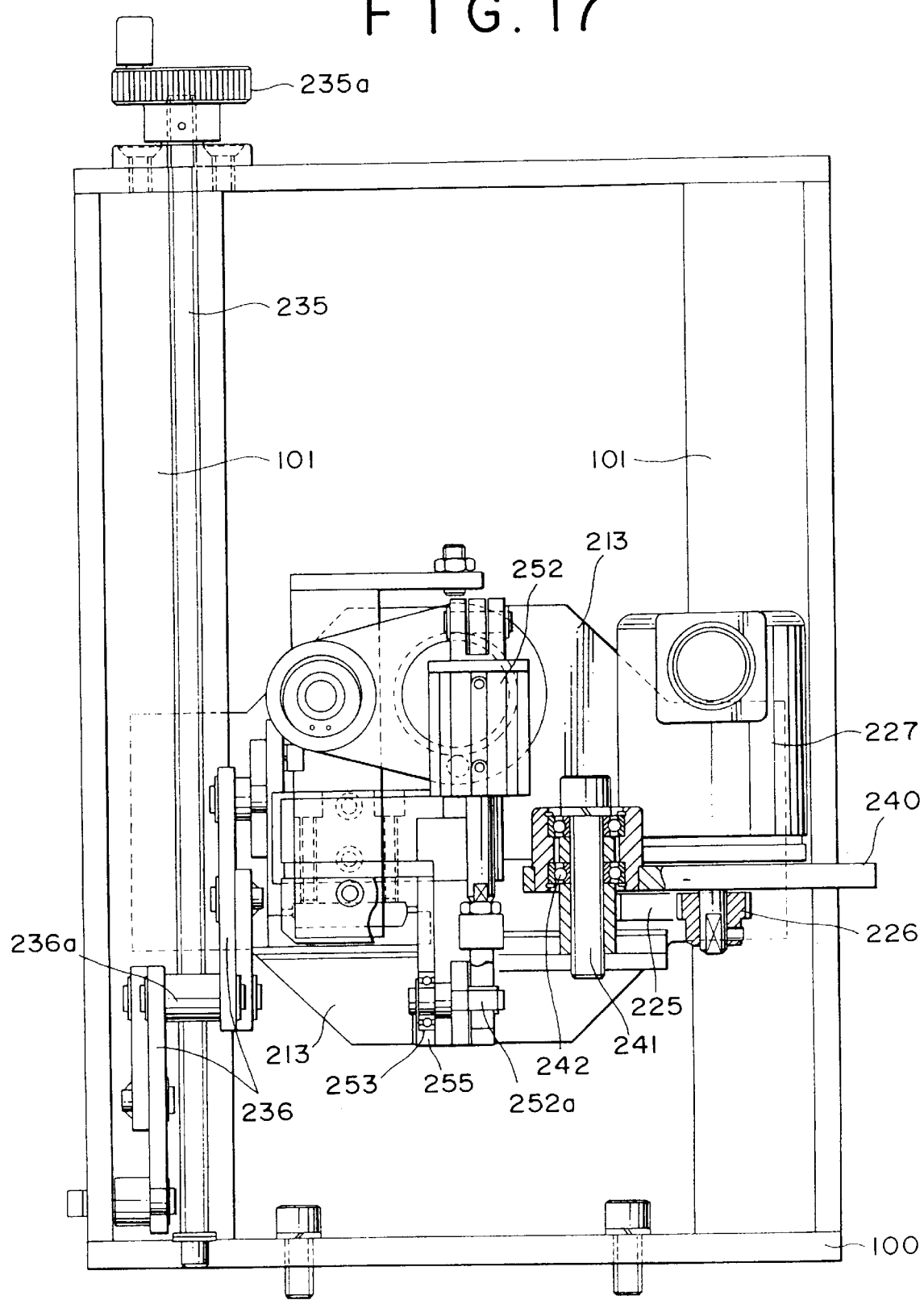
FIG. 17 is a side elevational view schematically showing a sensor member height adjusting mechanism incorporated in the apparatus shown in FIG. 14.
Figure 18:
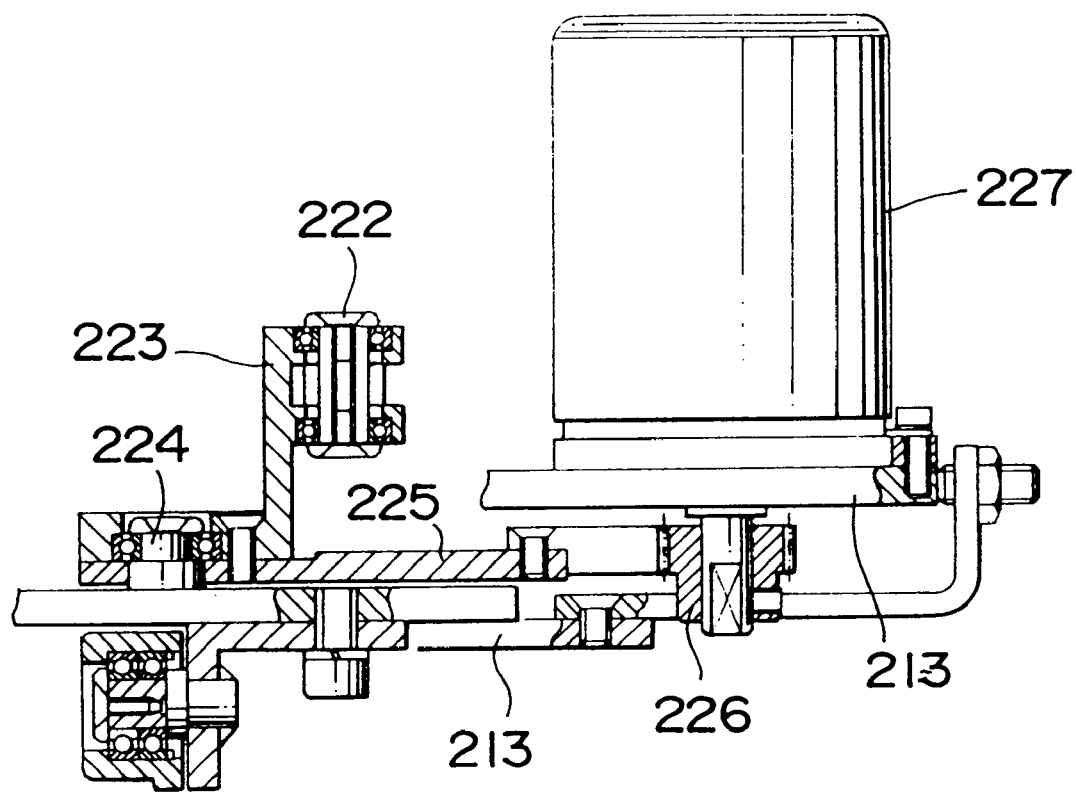
FIG. 18 is a front view schematically showing a sensor unit incorporated in the apparatus shown in FIG. 14.

Next, with particular reference to FIGS. 16 and 17, a mechanism for adjusting the height or vertical position of the sensor member will be described. A threaded rod 235 is rotatably provided on the casing (corresponding to the second frame) 101 and a knob 235a is provided at the top thereof. A moving member 236a, constituting part of a pantograph 236, is in a threaded engagement with the threaded rod 235. One end of pantograph 236 is pivoted at a location near the bottom of the casing 101 and the other end is pivoted at the holder 213. Thus, the pantograph 236 is operated to be opened or closed by rotating the knob 235a and thus the height or vertical position of the holder 231 and thus the sensor member can be adjusted to a desired location.

Also in the present embodiment, provision is made of a mechanism for restoring the sensor member to its original position. That is, as shown in FIG. 16, an initial position regulating plate 210a is integrally provided on the rotary member 210 as projecting rearwardly thereof (to the right in FIG. 16). On the other hand, the holder 213 is provided with a lock arm 251 rotatable around a rotating shaft 250, and the lock arm 251 is operatively coupled to an air cylinder 252 at its end. Thus, when the air cylinder 252 is actuated to cause the lock arm 251 to rotate around the shaft 205, a forward end 251a of the lock arm 251 is brought into engagement with the initial position regulating plate 201a so that the rotary member 210 may be set to its predetermined initial position. As a result, the sensor member may be forcibly brought to its predetermined initial position (e.g., its horizontal position).

Besides, as shown in FIGS. 14 and 16, a restoring plate 255 having a V-shaped section is fixedly attached to the bracket 219, and a rotary bearing 253 is supported by a shaft 252a mounted at the tip end of a rod forming part of the air cylinder 252. When this rotary bearing 253 is brought into engagement with the V-shaped section of the restoring plate 255, the sensor member and the encoder 227 can be restored to their original positions, respectively.

Moreover, in the present embodiment, an auxiliary pad 106a is provided on the sensor pad 106 so that it is normally the auxiliary pad 106a that is brought in direct contact with one side surface of a wheel to be examined. As shown in FIG. 16, the auxiliary pad 106a has a fragmentary columnar cross section. Thus, when the auxiliary pad 106a is brought into contact with one side surface of the wheel 11 to be examined, there is, in principle, defined a line contact rather than a surface contact. With such a contact condition, the contact condition between the sensor member and the wheel becomes smoother and errors are prevented from being produced.

Figure 19:
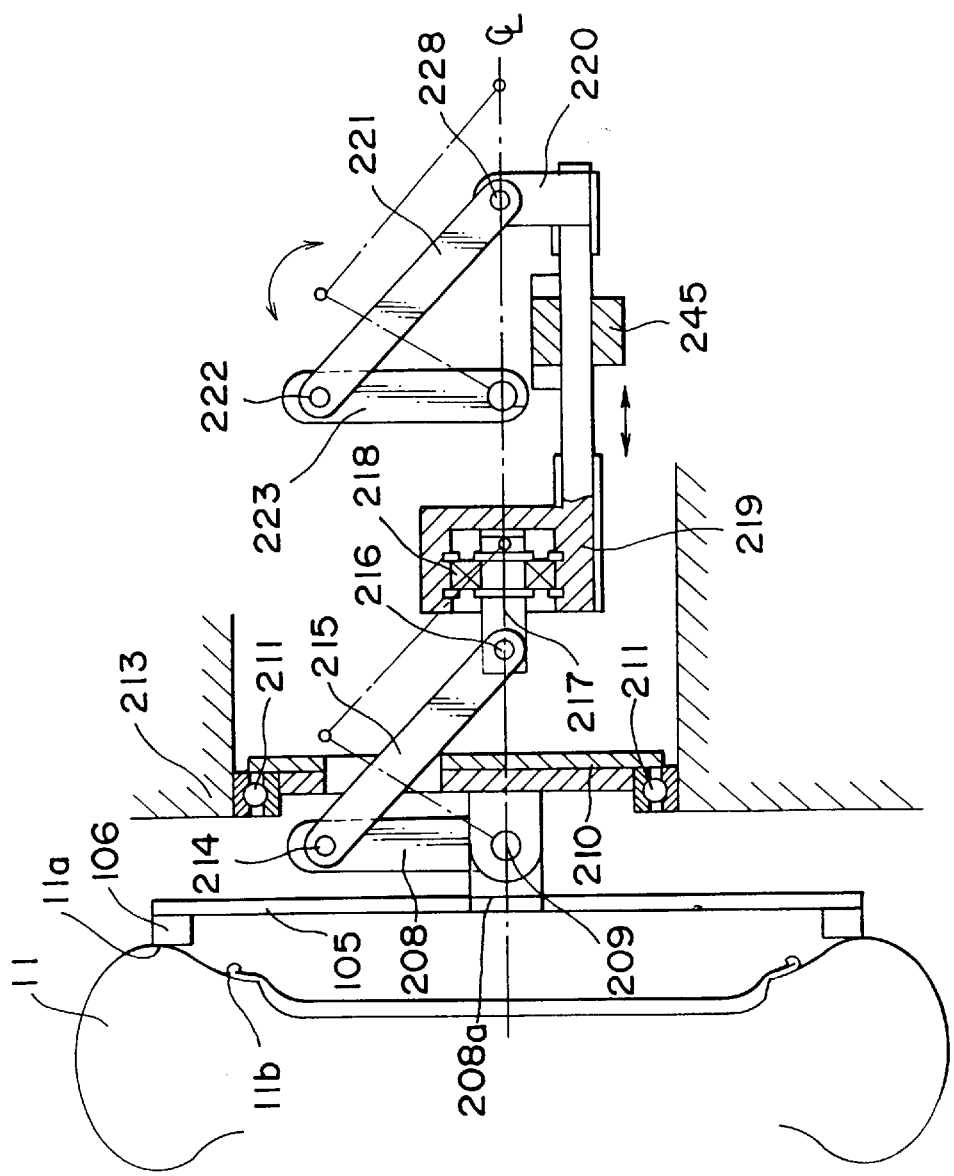
FIG. 19 is a schematic illustration useful for explaining the principle of operation of the apparatus shown in FIG. 14.

Referring now to FIG. 19, the principle of operation of an embodiment using a link mechanism in accordance with one aspect of the present invention will be described below. As shown in FIG. 19, a sensor member (in this case, including a sensor arm 105 and sensor pads 106) is brought into pressure contact with a side wall of a wheel (tire) 11 to be examined. It is to be noted that the term "wheel" is sometimes used to mean both a rotary member of a vehicle, including a tire and a wheel for supporting thereon the tire, and a wheel for supporting thereon a tire itself throughout the specification. In order to differentiate the word "wheel" for supporting a tire thereon from the word "wheel" including both a wheel for supporting a tire thereon and the tire, use is made of a term "support wheel" which signifies a wheel for supporting a tire thereon in the present specification. In this case, therefore, the word "wheel" includes both a support wheel and a tire, whereas, the word "support wheel" includes only a wheel itself for supporting thereon a tire.

Alternatively, it is also possible to construct an embodiment such that the sensor member is brought into pressure contact with a wheel, in particular its rim 11b, instead of the side wall of a tire as shown in FIG. 19. When the sensor member rotates together with the wheel 11 to be examined as pressed against one side surface of the wheel 11, the first through third link members 208, 215 and 217 also rotate in unison. During such rotation, the sensor member displaces in a direction perpendicular to the rotating direction of the sensor member in accordance with an inclination angle of the wheel 11. Such a displacement is converted into a linear motion at the third link member 217. Thus, if a sensor is provided for detecting a displacement of the third link member 217 in its linear motion, the toe and camber angles of the wheel 11 can be detected. Besides, the caster angle can be calculated from the amount of change in the camber angle as set forth before.

In the embodiment shown in FIG. 19, the third link member 217 is also operatively coupled to fourth through sixth link members 220, 221 and 223 via a bracket 219. As different from the first through third link members 208, 215 and 217, the bracket 291 and these fourth through sixth link members 220, 221 and 223 do not rotate around a center line CL. This is because the third link member 217 is coupled to the bracket 219 via a rotary bearing 218 and thus all of the components subsequent to the bracket 219 execute only those motions related to a linear motion of the third link member 217. In this manner, a linear motion of the third link member 217 is ultimately converted into a pivotal motion of the sixth link member 223 as indicated by the double-sided arrow, and this pivotal motion is detected by the encoder 227. When use is made of a link mechanism in this manner, depending on the rotary position of the sensor member, a linear motion at the third link member 217 is converted into a pivotal motion at the sixth link member 223, so that both of the toe and camber angles of the wheel 11 to be examined can be detected by an encoder and the link mechanism.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A wheel alignment examining apparatus, comprising:
   wheel supporting means for supporting a wheel to be examined;

a sensor member adapted to be pressed against at least one side of said wheel to be examined supported on said wheel supporting means;

an inclination angle detecting means operatively coupled to said sensor member for detecting an inclination angle of said wheel to be examined from a displacement of said sensor member;

a rotary sensor operatively coupled to said sensor member for detecting a king pin inclination angle of said wheel; and an examination apparatus support for supporting at least said sensor member and said inclination angle detecting means, said examination apparatus support being movable in forward and backward directions of said apparatus;

wherein said wheel supporting means includes:
  a pair of rollers for supporting thereon said wheel to be examined;
  a roller unit for holding said pair of rollers rotatably; and
  a table unit for supporting said roller unit, whereby said table unit includes a first table which is movable in the forward and backward directions of said apparatus and said examination apparatus support is fixedly attached to said first table.

2. The apparatus of claim 1, wherein said table unit includes a bearing for supporting said roller unit rotatable around a vertical axis and a second table for supporting said first table in a transverse direction of said apparatus, said bearing being mounted on said first table.

3. The apparatus of claim 1, wherein said examination apparatus support additionally supports said rotary sensor.

4. The apparatus of claim 1, wherein said sensor member is adapted to be pressed against at least one side of said wheel to rotate about an axis of rotation substantially identical to an axis of rotation of said wheel.

5. The apparatus of claim 4, wherein said sensor member comprises at least one rotatable sensor arm having an axis of rotation substantially identical to the axis of rotation of said wheel and including at least one sensor pad adapted to be pressed against a side of said wheel.

6. The apparatus of claim 4, wherein said examination apparatus support is adapted to be movable forward and backward in synchronism with said wheel supporting means.

7. A wheel alignment examining apparatus, comprising:

wheel supporting means for supporting a wheel to be examined;

a sensor member adapted to be pressed against at least one side of said wheel to be examined and to rotate about an axis of rotation substantially identical to an axis of rotation of said wheel;

an inclination angle detecting means operatively coupled to said sensor member for detecting an inclination angle of said wheel to be examined from a displacement of said sensor member; and an examination apparatus support for supporting at least said sensor member and said inclination angle detecting means, said examination apparatus support being movable in forward and backward directions of said apparatus;

wherein said wheel supporting means includes:
  a pair of rollers for supporting thereon said wheel to be examined;
  a roller unit for holding said pair of rollers rotatably; and
  a table unit for supporting said roller unit, whereby said table unit includes a first table which is movable in the forward and backward directions of said apparatus and said examination apparatus support is fixedly attached to said first table.

8. The apparatus of claim 7, wherein said table unit includes a bearing for supporting said roller unit rotatable around a vertical axis and a second table for supporting said first table in a transverse direction of said apparatus, said bearing being mounted on said first table.

9. The apparatus of claim 7, wherein said sensor member comprises at least one rotatable sensor arm having an axis of rotation substantially identical to the axis of rotation of said wheel and including at least one sensor pad adapted to be pressed against a side of said wheel.

10. The apparatus of claim 7, wherein said examination apparatus support is adapted to be movable forward and backward in synchronism with said wheel supporting means.

* * * * *